United States Patent
Tatemi

(10) Patent No.: US 12,269,678 B2
(45) Date of Patent: Apr. 8, 2025

(54) ARTICLE STORAGE FACILITY

(71) Applicant: Daifuku Co., Ltd., Osaka (JP)

(72) Inventor: Fumiaki Tatemi, Tokyo (JP)

(73) Assignee: Daifuku Co., Ltd., Osaka (JP)

(*) Notice: Subject to any disclaimer, the term of this patent is extended or adjusted under 35 U.S.C. 154(b) by 167 days.

(21) Appl. No.: 18/266,920

(22) PCT Filed: Dec. 1, 2021

(86) PCT No.: PCT/JP2021/044130
§ 371 (c)(1),
(2) Date: Jun. 13, 2023

(87) PCT Pub. No.: WO2022/130984
PCT Pub. Date: Jun. 23, 2022

(65) Prior Publication Data
US 2024/0051745 A1 Feb. 15, 2024

(30) Foreign Application Priority Data
Dec. 15, 2020 (JP) .................. 2020-207662

(51) Int. Cl.
*B65G 1/04* (2006.01)

(52) U.S. Cl.
CPC ......... *B65G 1/0421* (2013.01); *B65G 1/0435* (2013.01)

(58) Field of Classification Search
CPC ..................... B65G 1/0412; B65G 1/0435
See application file for complete search history.

(56) References Cited

U.S. PATENT DOCUMENTS

| | | | |
|---|---|---|---|
| 12,172,834 B2* | 12/2024 | Ueda ................. | B65G 1/065 |
| 2014/0377050 A1* | 12/2014 | Hellenbrand ........ | B65G 1/0435 |
| | | | 414/807 |
| 2015/0321845 A1* | 11/2015 | Nakamura ........... | B65G 1/0421 |
| | | | 414/273 |
| 2018/0127208 A1* | 5/2018 | Preidt ................ | B65G 1/0485 |
| 2018/0134488 A1* | 5/2018 | Grosse ............... | B65G 1/0435 |
| 2018/0339858 A1* | 11/2018 | Iwata ................ | B65G 1/0435 |
| 2018/0370729 A1* | 12/2018 | Ueda ................. | B65G 1/065 |
| 2021/0237976 A1* | 8/2021 | Tsukamoto ......... | B65G 1/1375 |
| 2022/0363479 A1* | 11/2022 | Wang ............... | G05B 19/41895 |
| 2023/0174301 A1* | 6/2023 | Ueda ................. | B65G 1/0492 |
| | | | 414/279 |
| 2023/0192402 A1* | 6/2023 | Wang ................. | B66F 9/07 |
| | | | 414/267 |
| 2023/0271779 A1* | 8/2023 | Siraisi ................ | B65G 1/0492 |
| | | | 700/218 |
| 2023/0348186 A1* | 11/2023 | Siraisi ................ | B65G 1/0421 |
| 2024/0034556 A1* | 2/2024 | Kiyokawa ........... | B65G 1/0421 |
| 2024/0034557 A1* | 2/2024 | Kiyokawa ........... | B65G 1/0435 |

FOREIGN PATENT DOCUMENTS

JP 2016113241 A 6/2016

* cited by examiner

*Primary Examiner* — Kaitlin S Joerger
(74) *Attorney, Agent, or Firm* — The Webb Law Firm

(57) ABSTRACT

In the case where two articles are held by a holding section (31), and an unloading operation is to be performed on the two articles, a controller first performs the unloading operation on the large article (WL), and then performs the unloading operation on the small article (WS). In the case of performing a scooping operation on two articles while no article is held by the holding section (31), the controller first performs the scooping operation on the small article (WS), and then performs the scooping operation on the large article (WL).

8 Claims, 8 Drawing Sheets

ARTICLE STORAGE FACILITY

CROSS-REFERENCE TO RELATED APPLICATIONS

This application is the United States national phase of International Application No. PCT/JP2021/044130 filed Dec. 1, 2021, and claims priority to Japanese Patent Application No. 2020-207662 filed Dec. 15, 2020, the disclosures of which are hereby incorporated by reference in their entireties.

BACKGROUND OF THE INVENTION

Field of the Invention

The present invention relates to an article storage facility that includes a first rack unit having first storage sections, a second rack unit that has second storage sections and is arranged facing the first rack unit, a mobile body that moves between the first rack unit and the second rack unit, and a transfer device mounted to the mobile body and including a holding section that holds an article that is to be transported, the transfer device being capable of transferring an article between the holding section and the first storage sections and between the holding section and the second storage sections.

DESCRIPTION OF RELATED ART

An example of an article storage facility such as that described above is disclosed in JP 2016-113241A (Patent Document 1). The reference numerals shown in parentheses in the following description of the related art are the reference numerals used in Patent Document 1. An automated warehouse (1), which is the article storage facility disclosed in Patent Document 1, includes a front rack (2a) that is provided with package storage shelves (11), a rear rack (2b) that is provided with package storage shelves (11) and is arranged facing the front rack (2a) in the front-rear direction (X), and a stacker crane (3) that travels in the left-right direction (Y) between the front rack (2a) and the rear rack (2b). The stacker crane (3) includes a side-arm transfer device (29) for loading and unloading a package (W), which is an article, to and from the package storage shelves (11).

The side-arm transfer device (29) includes arms (100, 110, 120) that can extend and withdraw in the front-rear direction (X), and as shown in FIGS. 16 and 17 of Patent Document 1, a package (W) can be loaded to or unloaded from a package storage shelf (11) by arranging a pair of adjacent arms so as to be separated by a gap set according to the width of the package (W), and extending or withdrawing the pair of arms in the front-rear direction (X). The package storage shelves (11) are configured to each be able to store two packages (W) side by side in the front-rear direction (X), and the side arm transfer device (29) can hold two packages (W) side by side in the front-rear direction (X) (and also two packages (W) side by side in the left-right direction (Y)).

Patent Document

Patent Document 1: JP 2016-113241A

Letting "first direction" be the shelf width direction (left-right direction in Patent Document 1) and "second direction" be the shelf depth direction (front-rear direction in Patent Document 1), in the article storage facility in Patent Document 1, the transfer device is configured to be able to hold two articles side by side in the second direction, as described above. For this reason, compared with the case where the transfer device cannot hold a plurality of articles side by side in the second direction, a larger number of articles can be held by the transfer device, and the articles can be collectively moved by the mobile body (a stacker crane in Patent Document 1), thus making it possible to improve the article processing efficiency in the article storage facility.

Articles having different dimensions in the first direction are handled in the article storage facility in Patent Document 1. In view of this, in the article storage facility in Patent Document 1, as shown in FIGS. 16 and 17 of the document, if two articles having equivalent dimensions in the first direction are side by side in the second direction on the transfer device, the two articles held side by side in the second direction by the transfer device can be transferred from the transfer device to a storage section (a package storage shelf in Patent Document 1), and two articles can be received from the storage section by the transfer device in such a manner that the two articles are held side by side in the second direction by the transfer device. In view of this, in the article storage facility in Patent Document 1, there is a constraint that two articles having equivalent dimensions in the first direction need to be arranged side by side in the second direction on the transfer device. In order to satisfy this constraint, it is conceivable to provide a reordering device, which changes the transport order of articles such that two articles having equivalent dimensions (specifically, dimensions in the direction corresponding to the first direction) are adjacent to each other, in the transport route (e.g., a conveyor line) for supplying articles that are to be stored in the storage section to the mobile body (specifically, the transfer device). However, in this case, there is a risk that the overall configuration of the article storage facility becomes complicated or large, and that the cost increases.

SUMMARY OF THE INVENTION

In view of the foregoing, there is desire to realize technology in which, when handling articles having different dimensions in the first direction, even if two articles having equivalent dimensions in the first direction are not arranged side by side in the second direction on the transfer device, it is possible to appropriately perform article transfer between a transfer device that can hold two articles side by side in the second direction and a storage section that can store two articles side by side in the second direction.

An article storage facility according to an aspect of the present disclosure includes: a first rack unit including a plurality of first storage sections aligned in a first direction along a horizontal plane; a second rack unit including a plurality of second storage sections aligned in the first direction, the second rack unit facing the first rack unit in a second direction orthogonal to the first direction in a vertical view along an up-down direction; a mobile body configured to move in the first direction at a position between the first rack unit and the second rack unit in the second direction; at least one transfer device mounted to the mobile body and including a holding section configured to hold a transfer target article, the at least one transfer device being configured to transfer the transfer target article between the holding section and the first storage sections and between the holding section and the second storage sections; and a controller configured to control operations of the mobile body and the at least one transfer device, wherein each of the first storage sections and each of the second storage sections is configured to store two articles side by side in the second direction, the holding section is configured to hold two articles side by side in the second direction, the at least one transfer device includes a pair of arms configured to extend and withdraw in the second direction, the at least one transfer device being further configured to change a distance between the pair of arms in the first direction, the at least one transfer device performs a transfer operation of transferring the transfer target article between the holding section and one of the first storage sections or one of the second storage sections by extending and withdrawing the pair of arms in the second direction while the transfer target article is located between the pair of arms in the first direction, the transfer operation includes (i) an unloading operation, in which the at least one transfer device delivers the transfer target article from the holding section to one of the first storage sections or one of the second storage sections, and (ii) a scooping operation, in which the transfer device transfers the transfer target article from one of the first storage sections or one of the second storage sections to the holding section, with a first article being an article on one side in the second direction and a second article being an article on another side in the second direction while the first article and the second article are held side by side in the second direction by the holding section, in the unloading operation performed on two articles while the two articles are held by the holding section, the controller first performs the unloading operation on a large article, which is an article having a larger dimension in the first direction out of the first article and the second article, and then performs the unloading operation on a small article, which is an article having a smaller dimension in the first direction out of the first article and the second article, and in the scooping operation performed on two articles that are to become the first article and the second article while no article is held by the holding section, the controller first performs the scooping operation on a small article, which is an article having a smaller dimension in the first direction out of the two articles, and then performs the scooping operation on a large article, which is an article having a larger dimension in the first direction out of the two articles.

According to this configuration, in the case where two articles are arranged in the holding section and the unloading operation is to be performed on the two articles, even if the dimensions of the two articles in the first direction are different from each other, by performing the unloading operation first on the large article and then on small article, the unloading operation can be performed on the small article while a large article is not present in the holding section. Accordingly, when performing the unloading operation on the small article, it is possible to avoid a situation in which the presence of a large article prevents the distance between the pair of arms in the first direction from being reduced to a distance suitable for the small article unloading operation, and both the large article and the small article can be appropriately delivered to the storage section (first storage section or second storage section, which similarly applies hereinafter) with the pair of arms.

Also, according to this configuration, in the case of performing the scooping operation on two articles that are to become the first article and the second article while no article is held by the holding section, even if the dimensions of the two items in the first direction are different from each other, by performing the scooping operation first on the small article and then on the large article, the scooping operation can be performed on the small article while a large article is not present in the holding section. Accordingly, when performing the scooping operation on the small article, it is possible to avoid a situation in which the presence of a large article prevents the distance between the pair of arms in the first direction from being reduced to a distance suitable for the small article scooping operation, and both the large article and the small article can be appropriately received from the storage section with the pair of arms.

As described above, according to this configuration, even if two articles having equivalent dimensions in the first direction are not arranged side by side in the second direction on a transfer device, article transfer can be appropriately performed between a transfer device that can hold two articles side by side in the second direction and a storage section that can store two articles side by side in the second direction.

Further features and advantages of the article storage facility will become apparent from the following description of embodiments described with reference to the drawings.

DESCRIPTION OF THE INVENTION

An embodiment of an article storage facility will be described below with reference to the drawings.

Figure 1:
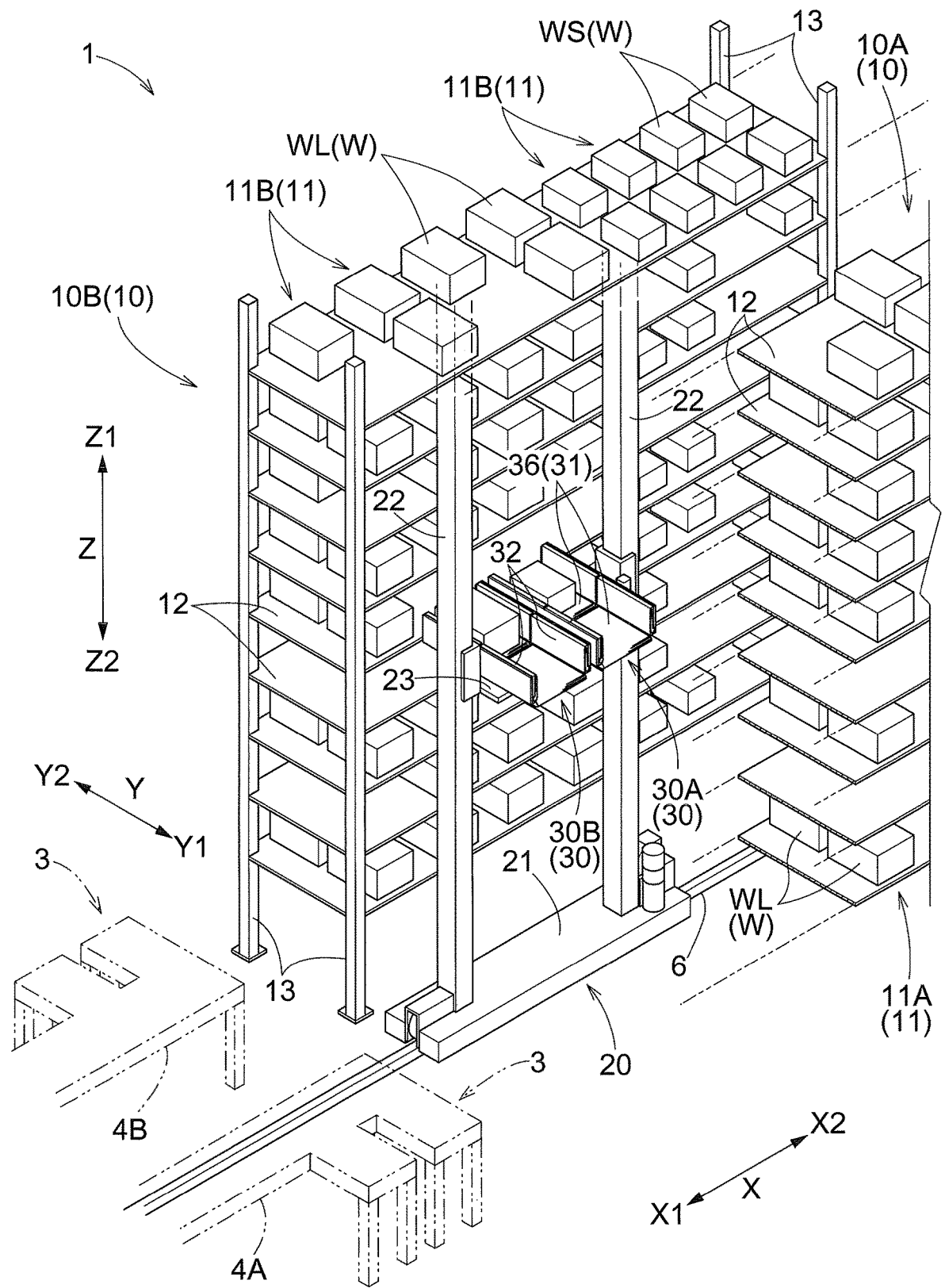
FIG. 1 is a perspective view of part of an article storage facility.
Figure 3:
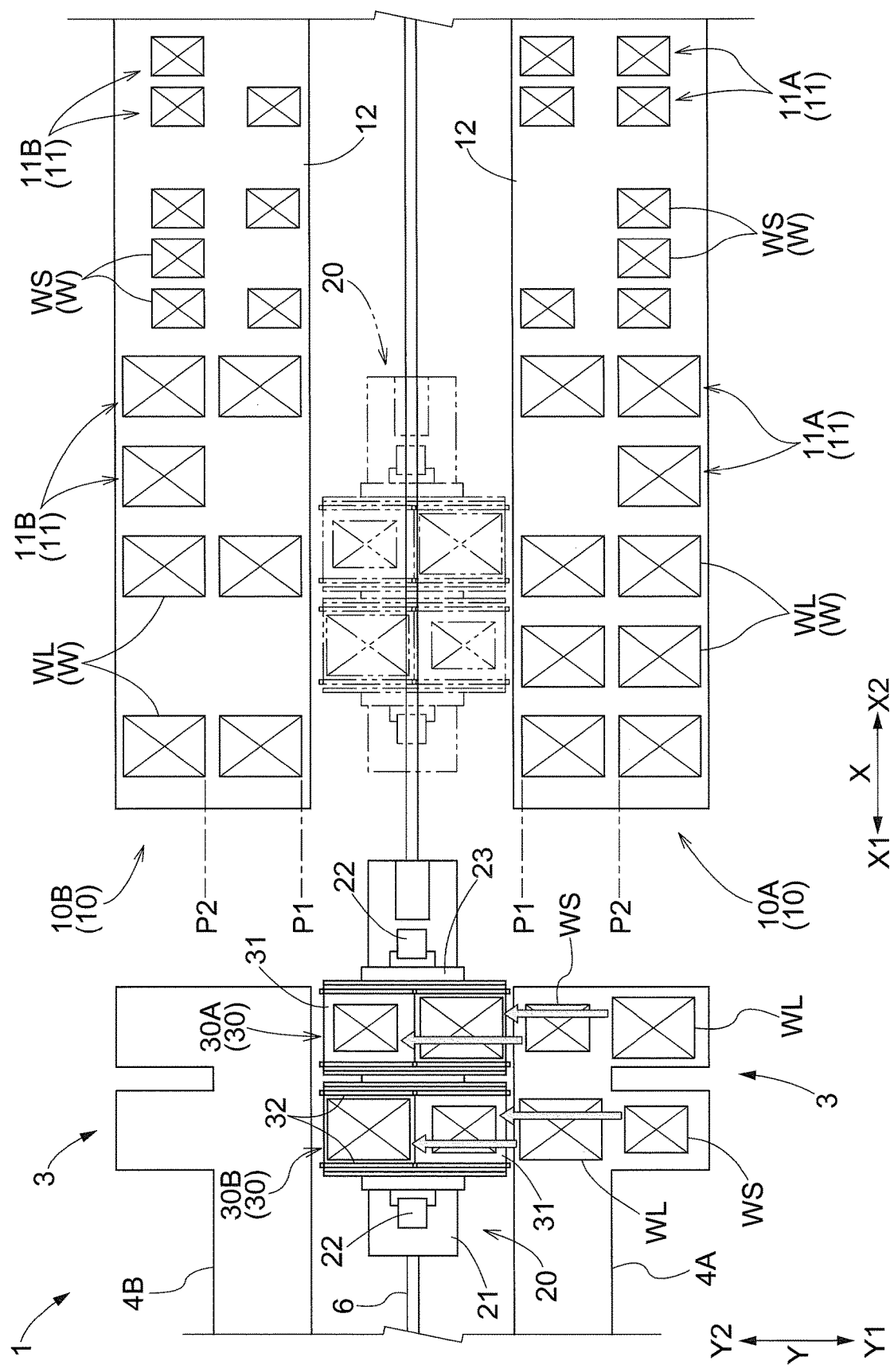
FIG. 3 is a diagram showing one aspect of loading control.

As shown in FIGS. 1 and 3, an article storage facility 1 includes a first rack unit 10A, a second rack unit 10B, a mobile body 20, and a transfer device 30 mounted to the mobile body 20. The first rack unit 10A includes a plurality of first storage sections 11A aligned in a first direction X, and the second rack unit 10B includes a plurality of second storage sections 11B aligned in the first direction X. The second rack unit 10B is arranged facing the first rack unit 10A in a second direction Y. The second rack unit 10B is spaced apart in the second direction Y from the first rack unit 10A. Hereinafter, the collective term "rack unit 10" will be used when describing matter common to the first rack unit 10A and the second rack unit 10B, and the collective term "storage section 11" will be used when describing matter common to the first storage section 11A and the second storage section 11B.

The first direction X is a direction along the horizontal plane. One side in the first direction X will be referred to as a first side X1 in the first direction, and the other side in the first direction X (the side opposite to the first side X1 in the first direction) will be referred to as a second side X2 in the first direction. The second direction Y is a direction orthogonal to the first direction X in a vertical view along an up-down direction Z (vertical direction). Here, the second direction Y is a direction along the horizontal plane. One side in the second direction Y will be referred to as a first side Y1 in the second direction, and the other side in the second direction Y will be referred to as a second side Y2 in the second direction. The first rack unit 10A is arranged on the first side Y1 in the second direction of the second rack unit 10B.

As shown in FIG. 1, the rack unit 10 includes support shelves 12 that support articles W (more specifically, supports them from a downward side Z2). The support shelves 12 are fixed to columns 13 erected on the floor. Articles W are stored in the rack unit 10 in a state of being supported by the support shelves 12. In other words, the storage sections 11 are formed by the support shelves 12, and the size of the storage sections 11 in the second direction Y is determined according to the dimensions of the support shelves 12 in the second direction Y. The support shelves 12 are plate shaped (including the case where a plurality of members are assembled to form a plate shape as a whole), and in this embodiment, as shown in FIG. 1, a plurality of articles W are arranged side by side in the first direction X while being supported by one support shelf 12. The articles W are a cardboard case, a container case, or the like.

Two articles W can be stored side by side in the second direction Y in each of the storage sections 11 (specifically, each of the first storage sections 11A and each of the second storage sections 11B). In other words, the articles W to be handled by the article storage facility 1 include articles W whose dimensions (specifically, dimensions in the direction corresponding to the second direction Y while stored in a storage section 11) allow two articles W to be stored side by side in the second direction Y in a storage section 11. The articles W handled by the article storage facility 1 may also include articles W having dimensions according to which a storage section 11 is approximately entirely occupied by one article W. In the case where two articles W are stored side by side in the second direction Y in a storage section 11, as shown in FIG. 3, the article W on the near side (the side on which article W transfer is performed by the mobile body 20) is stored at a first storage position P1, and the article W on the far side (the side opposite to the near side in the second direction Y) is stored at a second storage position P2 that is on the far side of the first storage position P1.

As shown in FIG. 1, in the present embodiment, the rack unit 10 includes a plurality of storage sections 11 aligned in the up-down direction Z. Specifically, a plurality of support shelves 12 are fixed to the columns 13 with gaps therebetween in the up-down direction Z, and articles W are stored in a state of being supported by a support shelf 12 at each of a plurality of levels (shelf levels) in the up-down direction Z.

The mobile body 20 moves in the first direction X at a position between the first rack unit 10A and the second rack unit 10B in the second direction Y. In the present embodiment, the mobile body 20 is a stacker crane. Specifically, the mobile body 20 includes a travel section 21 that travels along the first direction X, masts 22 erected on the traveling section 21, and a lifting and lowering section 23 that ascends and descends (moves along the up-down direction Z) while being guided by the masts 22, and the transfer device 30 is supported by the lifting and lowering section 23. The travel route of the travel section 21 is formed by rails 6 disposed along the first direction X. Due to the travel section 21 traveling along the first direction X, the mobile body moves along the first direction X. Through movement operations performed by the mobile body 20 (here, travel operations performed by the travel section 21) and lifting and lowering operations performed by the lifting and lowering section 23, the transfer device 30 is moved to a position that corresponds to an article W transfer location (a storage section 11 or a later-described loading and unloading section 3).

The mobile body 20 transports articles W between the loading and unloading section 3 and the rack units 10 (specifically, the storage sections 11). An article W to be stored in a rack unit 10 is carried in from a loading line or the like to the loading and unloading section 3, and then transported from the loading and unloading section 3 to a storage section 11 by the mobile body 20 and stored in the storage section 11. An article W to be unloaded from a rack unit 10 is retrieved from the corresponding storage section 11 by the mobile body 20 and transported to the loading and unloading section 3, and is then transported from the loading and unloading section 3 to a shipping line or the like. In the case of transferring articles W to or from the first rack unit 10A (specifically, the first storage sections 11A), the mobile body 20 performs such transfer from the second side Y2 in the second direction, and in the case of transferring articles W to or from the second rack unit 10B (specifically, the second storage sections 11B), the mobile body 20 performs such transfer from the first side Y1 in the second direction.

Figure 11:
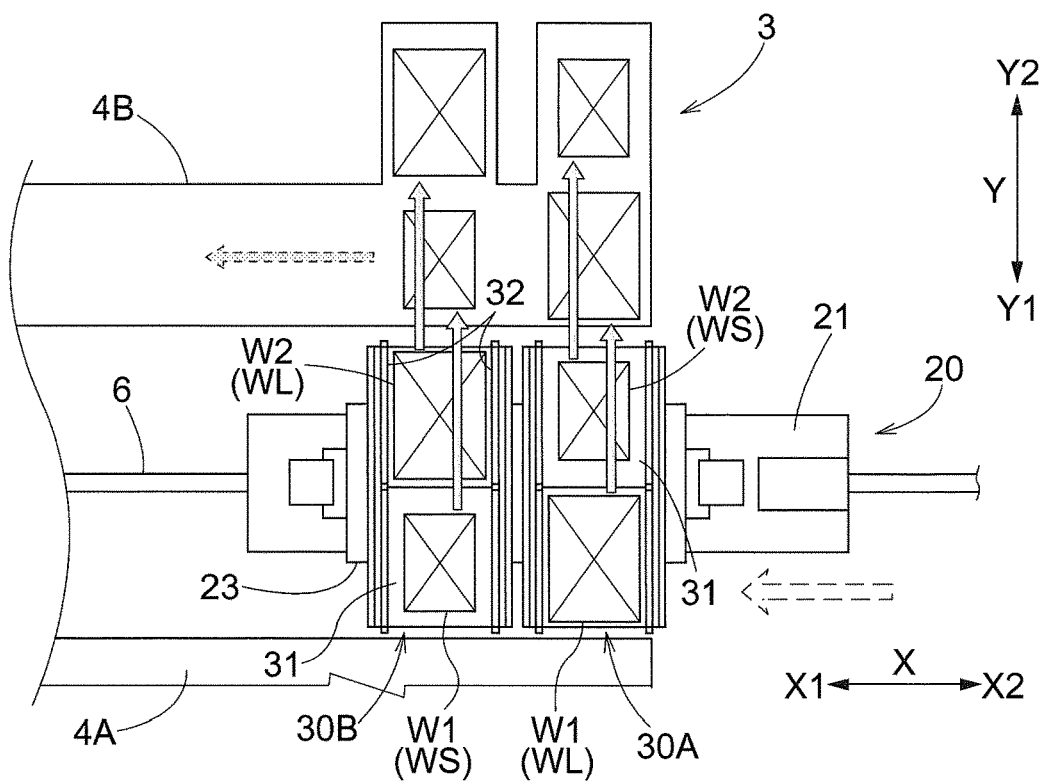
FIG. 11 is a diagram showing a situation after FIG. 10 in unloading control.

As shown in FIG. 1, in the present embodiment, the loading and unloading section 3 is provided with a first conveyor 4A and a second conveyor 4B. The first conveyor 4A is a loading conveyor (e.g., a conveyor constituting a loading line) for carrying articles W to the loading and unloading section 3, and the second conveyor 4B is an unloading conveyor (e.g., a conveyor that constitutes a shipping line) for carrying articles W out of the loading and unloading section 3. As shown in FIGS. 3 and 11, the first conveyor 4A and the second conveyor 4B are configured such that four articles W arranged in two rows in both the first direction X and the second direction Y can be placed in the loading and unloading section 3. The first conveyor 4A is configured such that four articles W carried to the loading and unloading section 3 can be arranged as described above in the loading and unloading section 3, and the second conveyor 4B is configured such that four articles W arranged as described above in the loading and unloading section 3 can be carried out from the loading and unloading section 3. The portions of the first conveyor 4A and the second conveyor 4B that are arranged in the loading and unloading section 3 are each constituted by, for example, a roller conveyor and a chain transfer (chain conveyor) that can ascend and descend between the rollers of the roller conveyor and transport articles W in a direction orthogonal to the direction in which articles W are transported by the roller conveyor.

As shown in FIGS. 1 and 3, the transfer device 30 includes a holding section 31 that holds articles W to be transported, and transfers articles W between the holding section 31 and both the first storage sections 11A and the second storage sections 11B. The transfer device 30 can transfer an article W between the first storage position P1 and the holding section 31 (see FIGS. 6 and 10), and can transfer an article W between the second storage position P2 and the holding section 31 (see FIGS. 4 and 9). In the present embodiment, the article storage facility 1 (specifically, the mobile body 20) includes two transfer devices 30, namely a first transfer device 30A and a second transfer device 30B, which are capable of performing transfer operations independently of each other. The two transfer devices 30 are arranged at different positions in the first direction X, and here, the one of these two transfer devices 30 that is arranged on the second side X2 in the first direction is the first transfer device 30A, and the other one arranged on the first side X1 in the first direction is the second transfer device 30B. In the present embodiment, the first transfer device 30A and the second transfer device 30B are supported side by side in the first direction X by the same lifting and lowering section 23, and ascend and descend integrally with each other as the lifting and lowering section 23 ascends and descends. Hereinafter, the collective term "transfer device 30" will be used when describing matter common to the first transfer device 30A and the second transfer device 30B.

Figure 4:
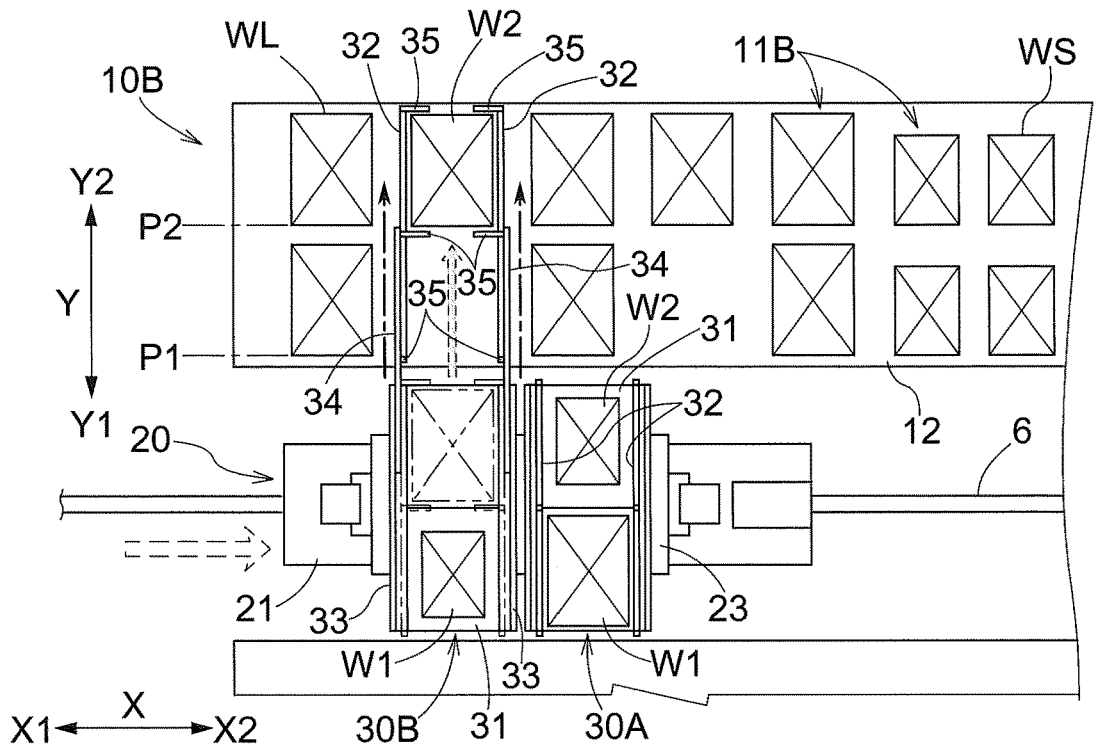
FIG. 4 is a diagram showing a situation after FIG. 3 in loading control.

The holding section 31 holds an article W by supporting the article W from the downward side Z2. As shown in FIG. 3, the holding section 31 can hold two articles W side by side in the second direction Y. In other words, the articles W to be handled by the article storage facility 1 include articles W having dimensions (specifically, dimensions in the direction corresponding to the second direction Y while stored on the holding section 31) according to which two articles W can be held side by side in the second direction Y on the holding section 31. As shown in FIGS. 4 and 11, while two articles W are arranged side by side in the second direction Y on the holding section 31, the article W on one side in the second direction Y (here, the first side Y1 in the second direction) is a first article W1, and the article W on the other side in the second direction Y (here, the second side Y2 in the second direction) is a second article W2.

Figure 5:
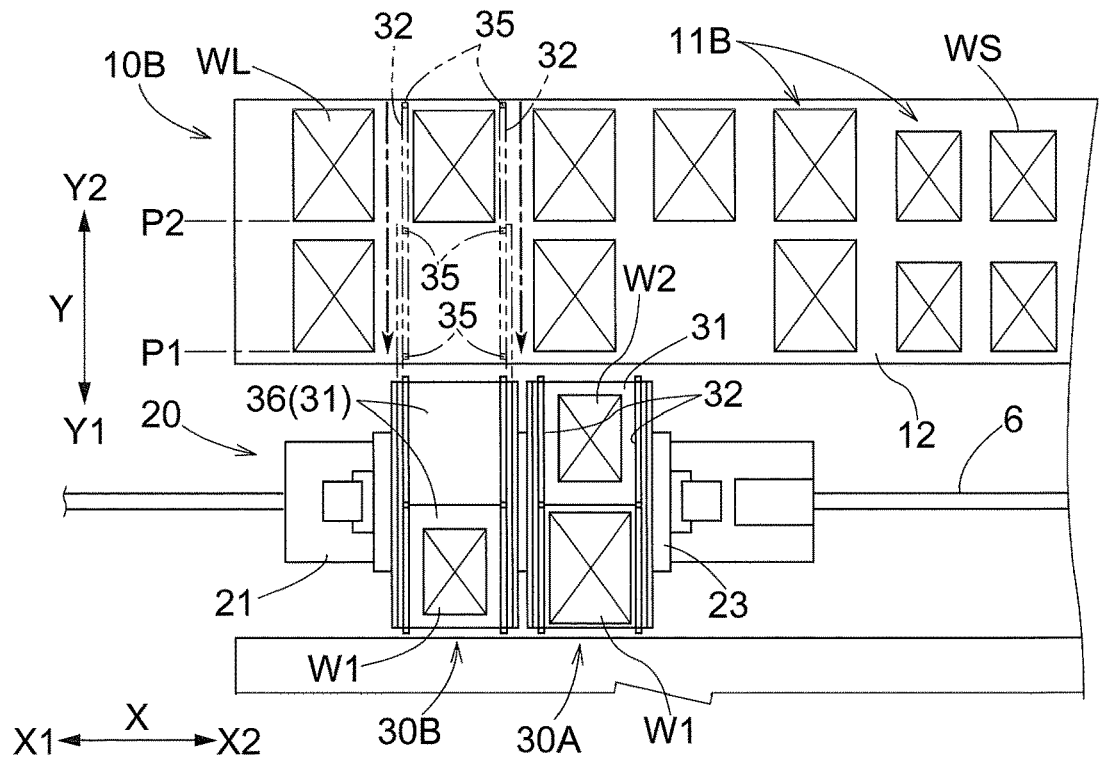
FIG. 5 is a diagram showing a situation after FIG. 4 in loading control.

As shown in FIGS. 1 and 5, in the present embodiment, the holding section 31 includes a conveyor 36 (e.g., a belt conveyor) that transports articles W in the second direction Y. Articles W are held by the holding section 31 in a state of being placed on the conveying surface of the conveyor 36. The conveyor 36 is configured to be able to transport articles W toward both sides in the second direction Y. In the present embodiment, the holding section 31 includes two conveyors 36 capable of performing article W conveying operations independently of each other. The two conveyors 36 are arranged side by side in the second direction Y, the first article W1 is held on the conveyor 36 on the first side Y1 in the second direction, and the second article W2 is held on the conveyor 36 on the second side Y2 in the second direction.

Figure 7:
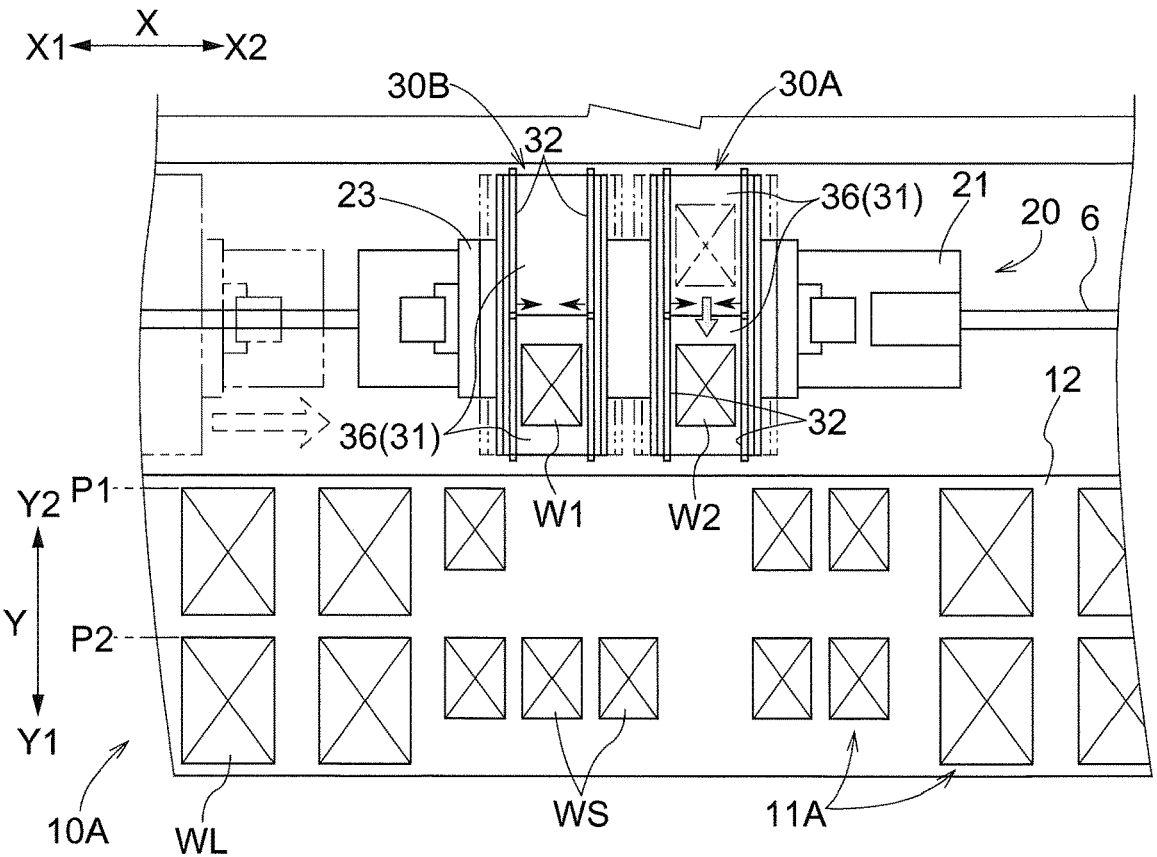
FIG. 7 is a diagram showing a situation after FIG. 6 in loading control.

As shown in FIGS. 1, 4, and 7, the transfer device 30 includes a pair of arms 32 that can be moved toward and away from each other in the first direction X and can extend and withdraw in the second direction Y. Each of the two arms 32 is shaped as a flat plate whose thickness direction (direction orthogonal to the plate surface) conforms to the first direction X. The transfer device 30 changes the distance between the pair of arms 32 in the first direction X by moving at least one (both in the present embodiment) of the pair of arms 32 in the first direction X. The transfer device 30 transfers an article W between the storage section 11 (first storage section 11A or second storage section 11B, which similarly applies hereinafter) and the holding section 31 by extending or withdrawing the pair of arms 32 in the second direction Y while the article W is arranged between the pair of arms 32 (specifically, between the pair of arms 32 in the first direction X, which similarly applies hereinafter). Specifically, the transfer device 30 adjusts the distance between the pair of arms 32 in the first direction X in accordance with the dimension in the first direction X of the transfer target article W located between the pair of arms 32, and extends or withdraws the pair of arms 32 in the second direction Y so as to transfer the article W. The pair of arms 32 can move toward both sides in the second direction Y, and the transfer device 30 can transfer an article W to both the first storage sections 11A and the second storage sections 11B.

As shown in FIG. 4, each of the two arms 32 is supported by a fixing member 33, which is fixed in position in the second direction Y (the position in the second direction Y relative to the mobile body 20), and the arms 32 can slide in the second direction Y. The arms 32 are arranged on the inward side in the first direction X (the side facing the center position in the first direction X between the pair of arms 32) of the fixing members 33 that support the arms 32. The arms 32 may be directly supported by the fixing members 33, but in the present embodiment, the arms 32 are indirectly supported by the fixing members 33 (specifically, via intermediate members 34 located between the arms 32 and the fixing members 33). At least one (both in the present embodiment) of the two fixing members 33 is configured to be able to change in position in the first direction X (the position in the first direction X relative to the mobile body 20), and the transfer device 30 changes the distance between the pair of arms 32 in the first direction X by changing the distance between the pair of fixing members 33 in the first direction X.

The operations for transferring an article W include an unloading operation, which is an operation for delivering an article W from the holding section 31 to a storage section 11, and a scooping operation, which is an operation for transferring an article W from a storage section 11 to the holding section 31. The transfer device 30 transfers an article W placed between the pair of arms 32 in the second direction Y by extending or withdrawing the pair of arms 32. Specifically, the transfer device 30 performs the unloading operation to deliver an article W from the holding section 31 to a first storage section 11A by extending the pair of arms 32 toward the first side Y1 in the second direction so as to move the article W held by the holding section 31 toward the first side Y1 in the second direction, and the transfer device 30 performs the scooping operation to transfer an article W from a first storage section 11A to the holding section 31 by withdrawing the pair of arms 32 toward the second side Y2 in the second direction so as to move the article W stored in the first storage section 11A toward the second side Y2 in the second direction. Also, the transfer device 30 performs the unloading operation to deliver an article W from the holding section 31 to a second storage section 11B by extending the pair of arms 32 toward the second side Y2 in the second direction so as to move the article W held by the holding section 31 toward the second side Y2 in the second direction, and the transfer device 30 performs the scooping operation to transfer an article W from a second storage section 11B to the holding section 31 by withdrawing the pair of arms 32 toward the first side Y1 in the second direction so as to move the article W stored in the second storage section 11B toward the first side Y1 in the second direction.

As shown in FIG. 4, in the present embodiment, each of the two arms 32 includes hooks 35 (an example of contact members), and the transfer device 30 moves an article W placed between the pair of arms 32 in the second direction Y by extending or withdrawing the pair of arms 32 so as to push or pull the article W with the hooks 35. Specifically, the transfer device 30 delivers an article W held by the holding section 31 to a storage section 11 by extending the pair of arms 32 such that the article W is pushed toward the storage section 11 by the hooks 35, and the transfer device 30 transfers an article W stored in a storage section 11 to the holding section 31 by withdrawing the pair of arms 32 such that the article W is pulled toward the holding section 31 by the hooks 35.

Figure 6:
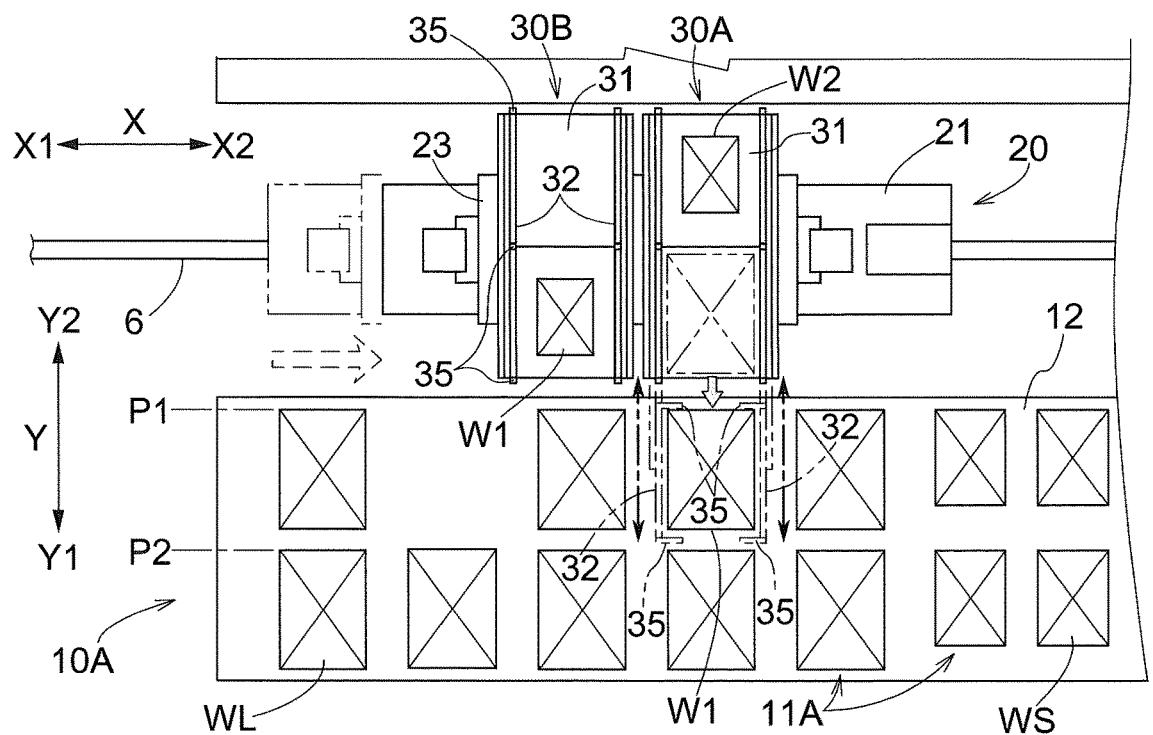
FIG. 6 is a diagram showing a situation after FIG. 5 in loading control.

As shown in FIGS. 4 to 6, each of the two arms 32 is provided with three hooks 35, namely a hook 35 provided at the end of the arm 32 on the first side Y1 in the second direction (hereinafter referred to as the "first-side hook"), a hook 35 provided at the end of the arm 32 on the second side Y2 in the second direction (hereinafter referred to as the "second-side hook"), and a hook 35 provided at the center of the arm 32 in the second direction Y (hereinafter referred to as the "central hook").

The hooks 35 are bar-shaped, and are coupled to the corresponding arm 32 while being swingable about the joint with the arm 32 (more specifically, swingable about an axis along the second direction Y). Each of the hooks 35 is configured to be switchable between a contact orientation for coming into contact with an article W and a retracted orientation for not coming into contact with an article W. The orientation of each of the hooks 35 is switched between the contact orientation and the retracted orientation by swinging the hook 35 about the joint with the arm 32.

The contact orientation is an orientation in which the leading end of the hook (the end on the side opposite to the joint with the arm 32) is inward, with respect to the first direction X, of the inward surface of the arm 32 (the surface facing inward in the first direction X). In FIG. 4, the second-side hooks and the center hooks provided on the arms 32 of the second transfer device 30B are in the contact orientation. The retracted orientation is an orientation in which the entirety of the hook 35 or substantially the entirety of the hook 35 is outward, with respect to the first direction X, of the inward surface of the arm 32 (i.e., is on the side away from the center position in the first direction X between the pair of arms 32). In FIG. 4, the first-side hooks provided on the arms 32 of the second transfer device 30B are in the retracted orientation. Also, in FIGS. 5 and 6, all of the hooks 35 (i.e., the first-side hooks, the second-side hooks, and the central hooks) provided on the arms 32 of the second transfer device 30B are in the retracted orientation.

The unloading operation and the scooping operation are performed in a state where the distance between the pair of arms 32 in the first direction X is a distance that corresponds to the dimension in the first direction X of the article W to be transferred (hereinafter referred to as the "transfer gap"). The transfer gap is set to the same value as the dimension in the first direction X of the article W to be transferred, or set to a value obtained by adding a set value to the dimension in the first direction X of the article W to be transferred. In the present embodiment, the transfer gap is a distance according to which the hooks 35 in the contact orientation come into contact with the article W to be transferred (specifically, the end face of the article W that faces the second direction Y), or in other words, is a distance according to which the hooks 35 in the contact orientation overlap the article W to be transferred when viewed along the second direction Y.

Here, "extension side" refers to the side toward which the pair of arms 32 extend, and "withdrawal side" refers to the side toward which the pair of arms 32 withdraw. In the case where the target storage section 11 is the first storage section 11A, the first side Y1 in the second direction is the extension side, and the second side Y2 in the second direction is the withdrawal side. In the case where the target storage section 11 is the second storage section 11B, the second side Y2 in the second direction is the extension side, and the first side Y1 in the second direction is the withdrawal side.

In the unloading operation, the transfer device 30 switches the orientation of the hook 35 of each of the two arms 32 that is adjacent to the withdrawal side of the transfer target article W to the contact orientation, and extends the pair of arms 32 with the distance therebetween set to the transfer gap, and thus the transfer target article W is pushed by the hooks 35 in the contact orientation until the transfer target article W is moved to a storage position (specifically, the first storage position P1 or the second storage position P2) for the article W in the storage section 11. In the case of simultaneously performing the unloading operation for two articles W side by side in the second direction Y in the holding section 31, the orientation of the hooks 35 adjacent to the withdrawal side of one of the articles W and the orientation of the hooks 35 adjacent to the withdrawal side of the other article W are switched to the contact orientation. Also, in the case of performing the unloading operation for only one article W out of two articles W side by side in the second direction Y in the holding section 31, the orientation of the hooks 35 adjacent to the withdrawal side of the article W that is not the transfer target is switched to the retracted orientation. The orientation of the hooks 35 adjacent to the extension side of the transfer target article W may also be switched to the contact orientation. In the present embodiment, in the unloading operation, the transfer device 30 causes the conveyor 36 supporting the transfer target article W to operate in synchronization with the movement direction and the movement speed of the article W being moved by the extending of the pair of arms 32.

FIG. 4 shows a situation in which the second transfer device 30B performs the unloading operation for transferring a second article W2, which is the transfer target article W, from the holding section 31 to a second storage section 11B. In the situation shown in FIG. 4, the second transfer device 30B switches the orientation of the hooks 35 adjacent to the withdrawal side of the second article W2 (here, the central hooks) to the contact orientation, and uses those hooks 35 to push the second article W2 to the second storage position P2 of the second storage section 11B. In the situation shown in FIG. 4, since the first article W1 is not the transfer target article W, the orientation of the hooks 35 adjacent to the withdrawal side of the first article W1 (here, the first-side hooks) is switched to the retracted orientation.

Figure 12:
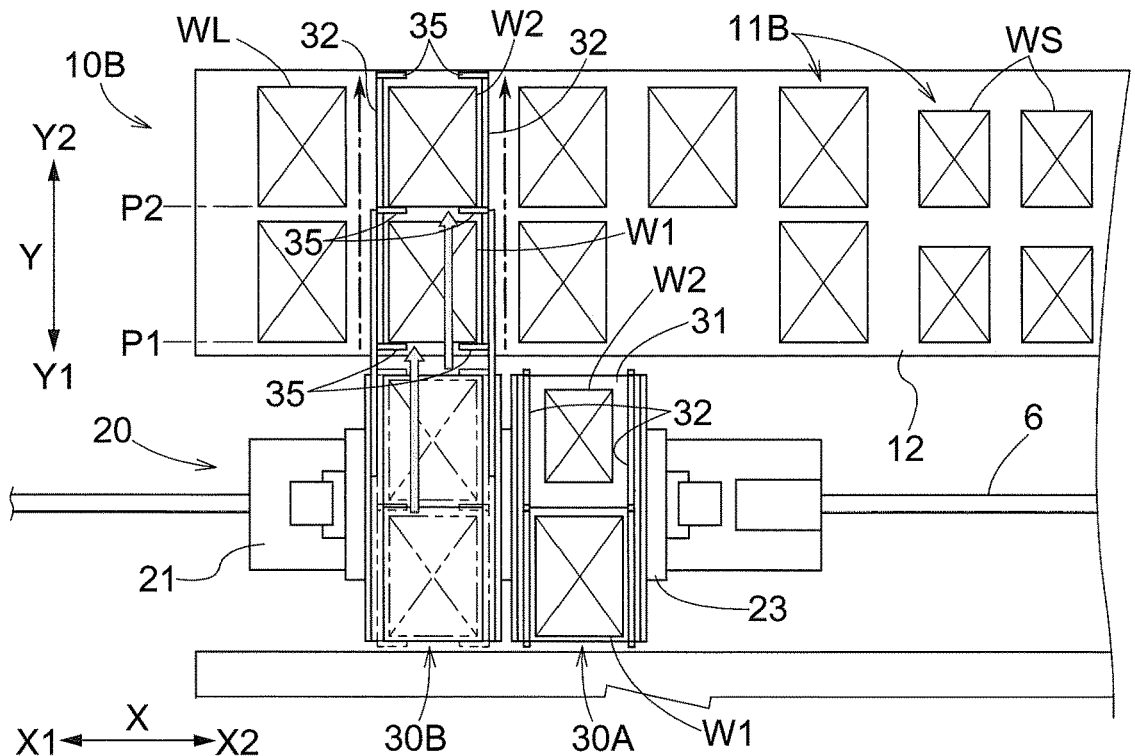
FIG. 12 is a diagram showing another aspect of loading control.

FIG. 12 shows a situation in which the second transfer device 30B performs the unloading operation to simultaneously deliver the first article W1 and the second article W2, which are two transfer target articles W, from the holding section 31 to a second storage section 11B. In the situation shown in FIG. 12, the second transfer device 30B switches the orientation of the hooks 35 adjacent to the withdrawal side of the first article W1 (here, the first-side hooks) to the contact orientation, and uses those hooks 35 to push the first article W1 to the first storage position P1 in the second storage section 11B, and also switches the orientation of the hooks 35 adjacent to the withdrawal side of the second article W2 (here, the central hooks) to the contact orientation, and uses those hooks 35 to push the second article W2 to the second storage position P2 in the second storage section 11B.

In the unloading operation, the transfer device 30 extends the pair of arms 32 until the transfer target article W moves to the storage position for the article W in the storage section 11, and then switches the orientation of at least the hook 35 of each of the two arms 32 that is adjacent to the extension side of the article W to the retracted orientation (e.g., switches the orientation of the all of the hooks 35 to the retracted orientation), and withdraws the pair of arms 32 in that state. In the case where the transfer target articles W are two articles W side by side in the second direction Y, the orientation of at least two hooks 35 of each of the arms 32 (specifically, the hook 35 adjacent to the extension side of one of the articles W and the hook 35 adjacent to the extension side of the other article W) is switched to the retracted orientation. Accordingly, the pair of arms 32 are withdrawn while leaving the transfer target article W in the storage section 11. After the pair of arms 32 extend, the distance between the pair of arms 32 in the first direction X may be increased before withdrawing the pair of arms 32.

In the scooping operation, the transfer device 30 extends the pair of arms 32 until the transfer target article W is located between two hooks 35 adjacent in the second direction Y of each of the two arms 32. In the case where the transfer target articles W are two articles W adjacent in the second direction Y in the storage section 11, the pair of arms 32 are extended until one of the articles W is located between, with respect to the second direction Y, the first-side hook and the central hook of each of the two arms 32, and also the other article W is located between, with respect to the second direction Y, the second-side hook and the central hook of each of the two arms 32.

At this time, the transfer device 30 switches the orientation of at least the hook 35 of each of the two arms 32 that moves on the extension side of the transfer target article W to the retracted orientation (e.g., switches the orientation of all of the hooks 35 to the retracted orientation), and extends the pair of arms 32 in that state. In the case where the transfer target articles W are two articles W side by side in the second direction Y in the storage section 11, the orientation of at least two hooks 35 of each of the two arms 32 (specifically, the hook 35 that moves on the extension side of one of the articles W and the hook 35 that moves on the extension side of the other article W) is switched to the retracted orientation. In the case of performing the scooping operation for one article W while another article W is being held by the holding section 31, the orientation of the hooks 35 adjacent to the withdrawal side of the article W held by the holding section 31 (in the situation shown in FIG. 10, the first-side hooks adjacent to the withdrawal side of the first article W1 held by the holding section 31) is also switched to the retracted orientation. After extending the pair of arms 32, the transfer device 30 withdraws the pair of arms 32 as described below, and, after extending the pair of arms 32, the distance between the pair of arms 32 in the first direction X may be reduced before withdrawing the pair of arms 32.

In the scooping operation, after extending the pair of arms 32 as described above, the transfer device 30 switches the orientation of the hook 35 of each of the two arms 32 that is adjacent to the extension side of the transfer target article W to the contact orientation, and withdraws the pair of arms 32 with the distance therebetween set to the transfer gap, and thus the transfer target article W is pulled by the hooks 35 in the contact orientation until the transfer target article W has moved to the holding position for the article W in the holding section 31 (specifically, the holding position at which the article W is the first article W1, or the holding position at which the article W is the second article W2). In the case of performing the scooping operation on two articles W side by side in the second direction Y at the same time, the orientation of the hooks 35 adjacent to the extension side of one of the articles W and the orientation of the hooks 35 adjacent to the extension side of the other article W are switched to the contact orientation. The orientation of the hooks 35 adjacent to the withdrawal side of the transfer target article W may also be switched to the contact orientation. In the present embodiment, in the scooping operation, the transfer device 30 causes the conveyor 36 supporting the transfer target article W to operate in synchronization with the movement direction and the movement speed of the article W being moved by the withdrawal of the pair of arms 32.

Figure 9:
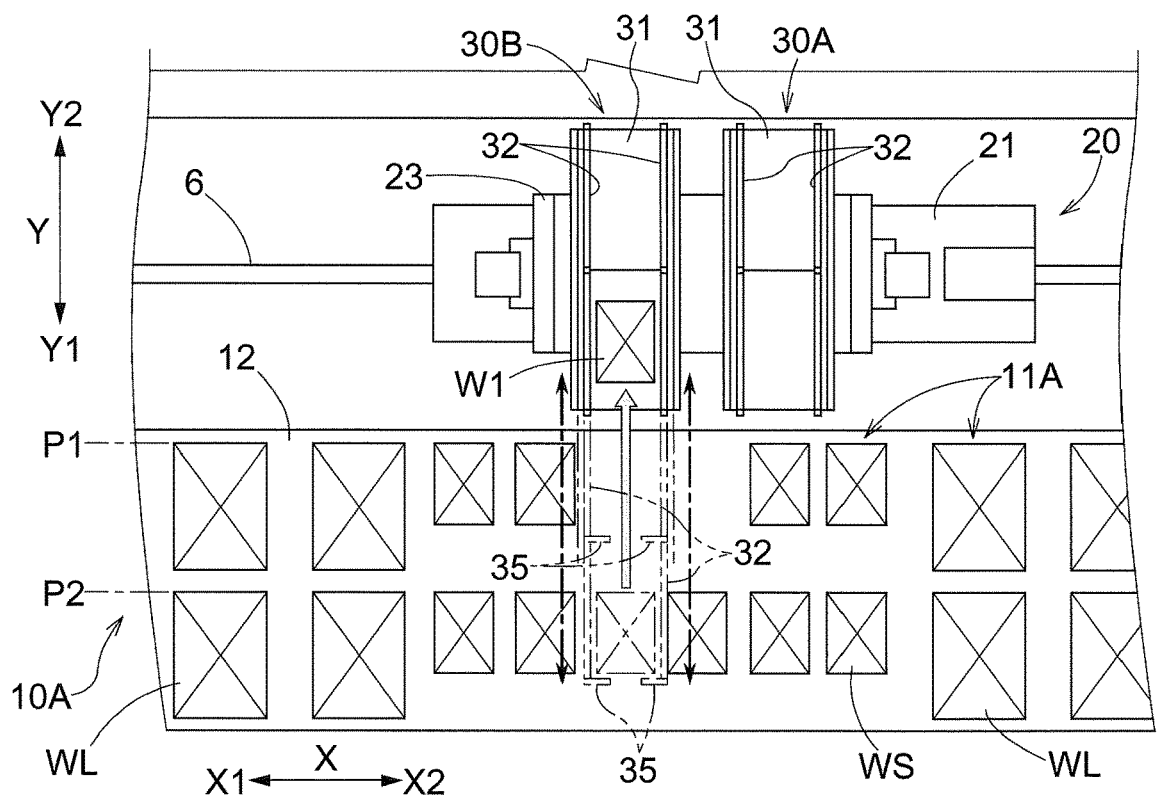
FIG. 9 is a diagram showing one aspect of unloading control.

FIG. 9 shows a situation in which the second transfer device 30B performs the scooping operation in which an article W stored at the second storage position P2 in the first storage section 11A is the transfer target article W, and that article W is transferred from the first storage section 11A to the holding section 31. In the situation shown in FIG. 9, the second transfer device 30B switches the orientation of the hooks 35 (here, the first-side hooks) adjacent to the extension side of the transfer target article W (the article W that is to become the first article W1) to the contact orientation, and uses those hooks 35 to pull the transfer target article W until that article W becomes the first article W1 in the holding section 31.

Figure 13:
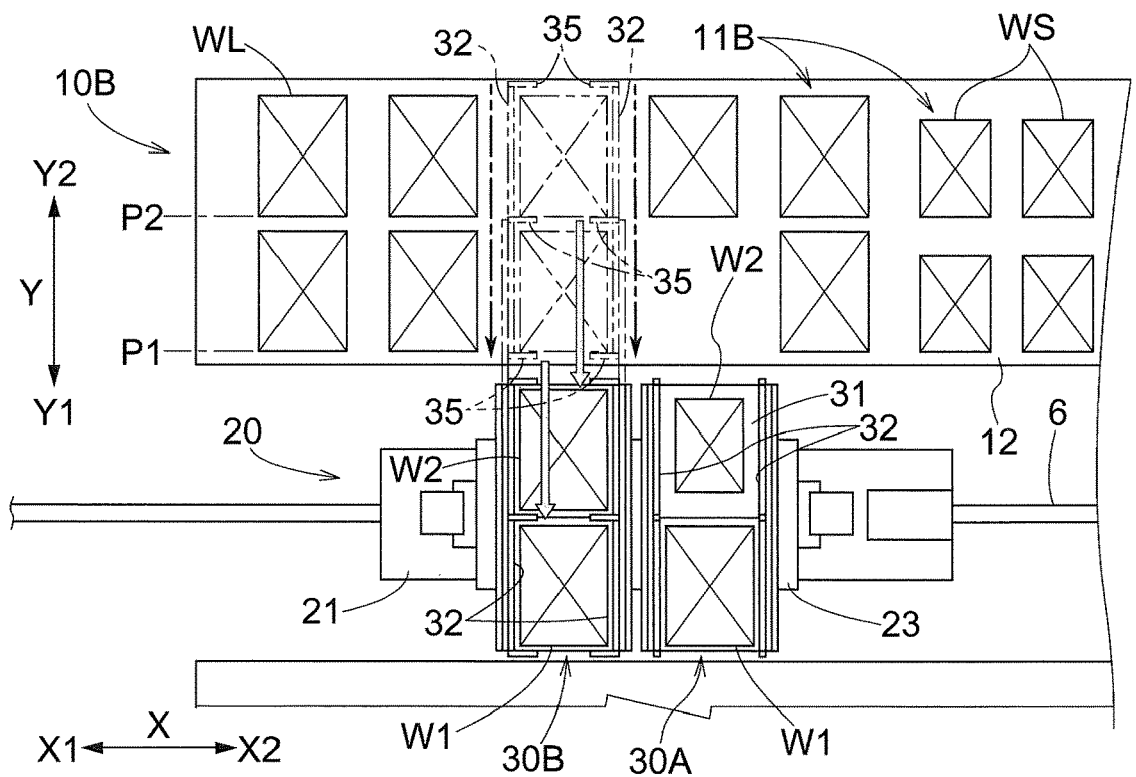
FIG. 13 is a diagram showing another aspect of unloading control.

FIG. 13 shows a situation in which the second transfer device 30B performs the scooping operation in which two articles W stored side by side in the second direction Y in the second storage section 11B are the two transfer target articles W, and those articles W are transferred from the second storage section 11B to the holding section 31. In the situation shown in FIG. 13, the second transfer device 30B switches the orientation of the hooks 35 (here, the central hooks) adjacent to the extension side of one of the transfer target articles W (the article W that is to become the first article W1) to the contact orientation, and uses those hooks 35 to pull the transfer target article W until that article W becomes the first article W1 in the holding section 31, and also switches the orientation of the hooks 35 (here, the second-side hooks) adjacent to the extension side of the other transfer target article W (the article W that is to become the second article W2) to the contact orientation, and uses those hooks 35 to pull the transfer target article W until that article W becomes the second article W2 in the holding section 31.

There are a plurality of types of articles W that have different dimensions in the first direction X (specifically, dimensions along the first direction X when held by the holding section 31 or stored in the storage section 11). Hereinafter, the "type" of an article W means the type when the article W is classified according to the dimension in the first direction X. In other words, the type of an article W is determined according to which of the predetermined dimension classes the dimension of the article W in the first direction X belongs to. Articles W of the same type have equivalent (the same or approximately the same) dimensions in the first direction X. In FIGS. 1 and 3, for example, there are two types of articles W, namely a small article WS that is an article W belonging to one dimension class, and a large article WL that is an article W belonging to a dimension class having a larger dimension in the first direction X, but there may also be articles W belonging to dimension classes other than these two dimension classes.

In the present embodiment, the dimension classes are set such that when two articles W arranged side by side in the second direction Y in the holding section 31 or the storage section 11 are of the same type, the two articles W can be transferred at the same time. Also, in the present embodiment, as shown in FIGS. 1 and 3, articles W of the same type are stored side by side in the second direction Y in each storage section 11.

Figure 2:
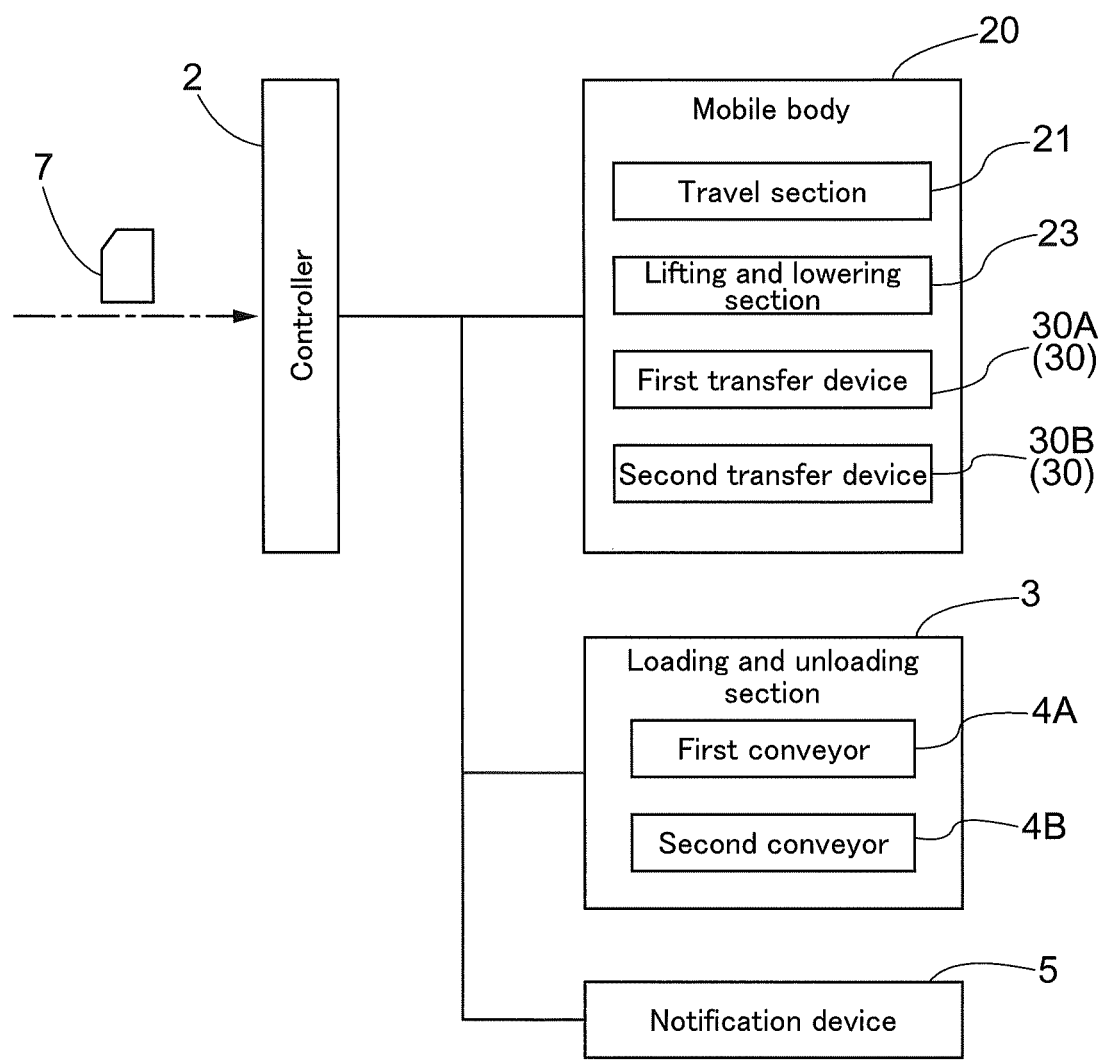
FIG. 2 is a control block diagram.

As shown in FIG. 2, the article storage facility 1 includes a controller 2 that controls operations of the mobile body 20 and the transfer device 30. The controller 2 controls the operations of the control target by controlling the driving of a drive force source (e.g., an electric motor or a solenoid) provided in corresponding sections. The controller 2 includes an arithmetic processing unit such as a CPU and peripheral circuits such as a memory, and function of the controller 2 are realized by such hardware operating in cooperation with programs executed on hardware such as the arithmetic processing unit. The controller 2 may be provided in the mobile body 20 or may be provided independently of the mobile body 20. Alternatively, the controller 2 may include a plurality of pieces of hardware that are separated while also being able to communicate with each other, and a configuration is possible in which some of the hardware is provided in the mobile body 20, while the rest of the hardware is provided independently of the mobile body 20. As shown in FIG. 2, in the present embodiment, the controller 2 also controls operations of the first conveyor 4A, the second conveyor 4B, and a later-described notification device 5.

The controller 2 causes the mobile body 20 to move along the first direction X. In the present embodiment, the controller 2 causes the mobile body 20 to perform a traveling operation for causing the travel section 21 to travel along the first direction X, and causes the mobile body 20 to perform a lifting and lowering operation for causing the lifting and lowering section 23 to ascend or descend. Also, the controller 2 causes the transfer device 30 to perform an extending and withdrawing operation in which the pair of arms 32 are extended or withdrawn in the second direction Y, and a gap change operation in which the distance between the pair of arms 32 in the first direction X is changed. In the present embodiment, the controller 2 further causes the transfer device 30 to perform a conveying operation in which an article W is conveyed by the conveyor 36, and an orientation switching operation in which the orientation of one or more of the hooks 35 is changed.

For example, the controller 2 receives a command from a higher-level control device, and performs loading control for loading an article W to a rack unit 10 and unloading control for retrieving an article W from a rack unit 10. Note that the technical features of the controller 2 disclosed in this specification can also be applied to a method of controlling the article storage facility 1, and the method of controlling the article storage facility 1 is also disclosed in this specification. This control method includes a step of causing the transfer device 30 to perform the unloading operation and a step of causing the transfer device 30 to perform the scooping operation, and in the present embodiment, the control method further includes a step of causing the transfer device 30 to perform a later-described narrowing operation, a step of causing the notification device 5 to issue a later-described abnormality notification, and a step of setting the position and the width of a storage section 11 in a rack unit 10 in correspondence with the dimension in the first direction X of the article W that is to be stored.

An example of the loading control executed by the controller 2 will be described below with reference to FIGS. 3 to 8 that show situations at various times in the loading control in sequential order.

As shown in FIG. 3, the controller 2 causes the mobile body 20 to perform movement operations (in the present embodiment, the movement operations include traveling of the travel section 21 and ascending and descending of the lifting and lowering section 23, which similarly applies hereinafter) such that the transfer device 30 (in the present embodiment, both the first transfer device 30A and the second transfer device 30B) becomes located at a position that corresponds to the loading and unloading section 3. As shown in FIG. 3, the position corresponding to the loading and unloading section 3 is a position where an article W can be transferred between the holding section 31 and the loading and unloading section 3, and specifically is a position at which the transfer device 30 faces the loading and unloading section 3 in the second direction Y (faces in the second direction Y at the same height (position in the up-down direction Z), which similarly applies hereinafter).

While the transfer device 30 is located at a position corresponding to the loading and unloading section 3, the article W is transferred from the loading and unloading section 3 to the holding section 31. The transfer of the article W between the loading and unloading section 3 and the holding section 31 is performed by at least either a device provided in the loading and unloading section 3 or the transfer device 30 (both in the present embodiment). In the present embodiment, through conveying performed by the first conveyor 4A provided in the loading and unloading section 3 and conveying performed by the conveyor 36 provided in the transfer device 30, the article W is moved from the loading and unloading section 3 to the holding section 31, and thus the article W is transferred from the loading and unloading section 3 to the holding section 31. For example, the article W is transferred between the loading and unloading section 3 and the holding section 31 while the distance between the pair of arms 32 in the first direction X has been set to the maximum value in the range of possible values for the distance.

FIG. 3 shows a situation in which articles W are transferred from the loading and unloading section 3 to the holding sections 31 of the first transfer device 30A and the second transfer device 30B such that two articles W (specifically, one large article WL and one small article WS) arranged side by side in the second direction Y in the loading and unloading section 3 are subsequently held side by side in the same order in the second direction Y in the holding section 31 of the first transfer device 30A, and also two other articles W (specifically, one large article WL and one small article WS) arranged side by side in the second direction Y in the loading and unloading section 3 are subsequently held side by side in the same order in the second direction Y in the holding section 31 of the second transfer device 30B.

When the transfer of the articles W from the loading and unloading section 3 to the holding section 31 is complete, the controller 2 causes the mobile body 20 to perform movement operations such that the transfer device 30 becomes located at a position corresponding to the transfer target storage section 11. As shown in FIG. 4, the position corresponding to the storage section 11 is a position at which the article W can be transferred between the holding section 31 and the storage section 11, and more specifically is a position at which the transfer device 30 faces the storage section 11 in the second direction Y. The controller 2 causes the transfer device 30 to perform the unloading operation while the transfer device 30 is located at a position corresponding to the transfer target storage section 11.

Figure 8:
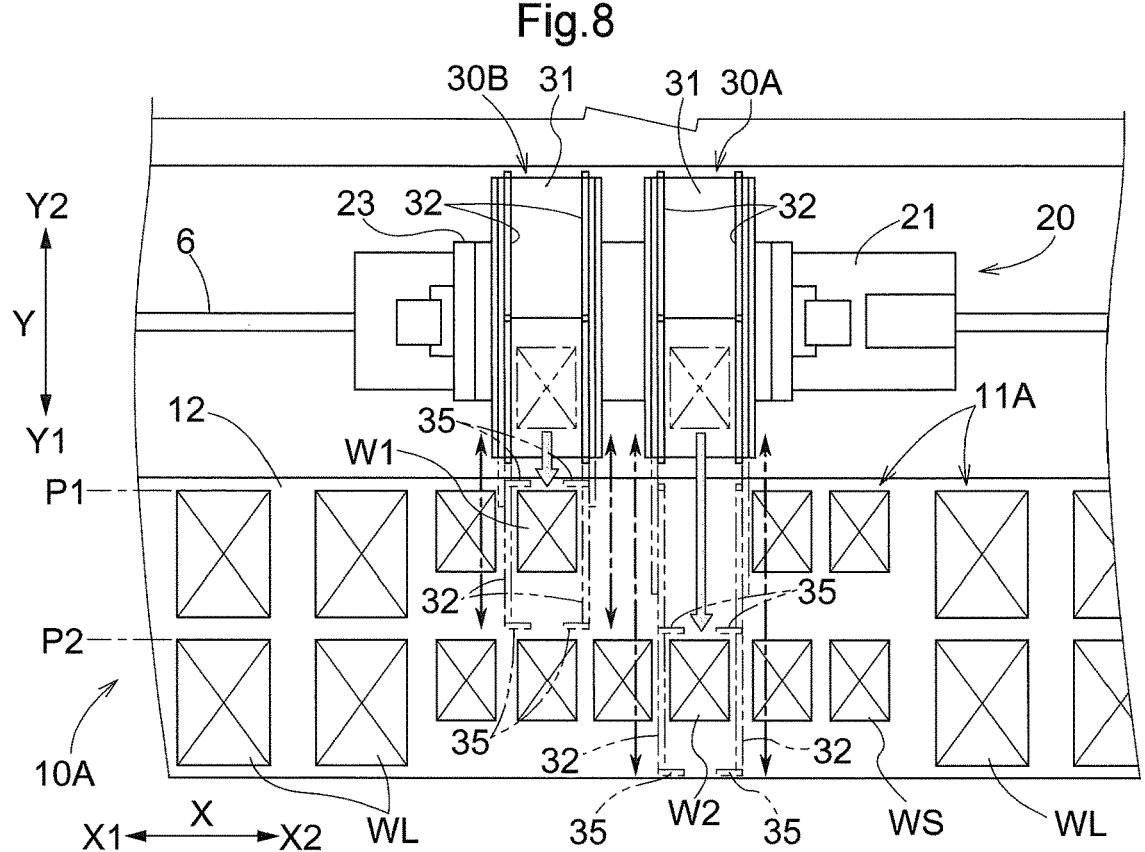
FIG. 8 is a diagram showing a situation after FIG. 7 in loading control.

In this example, the controller 2 sequentially executes a movement operation for moving the second transfer device 30B to the position corresponding to the transfer target storage section 11, an unloading operation for unloading the second article W2 with the second transfer device 30B (see FIGS. 4 and 5), a movement operation for moving the first transfer device 30A to the position corresponding to the transfer target storage section 11, an unloading operation for unloading the first article W1 with the first transfer device 30A (see FIG. 6), a movement operation for moving the first transfer device 30A and the second transfer device 30B to positions corresponding to the transfer target storage sections 11, and an unloading operation for unloading the second article W2 with the first transfer device 30A and an unloading operation for unloading the first article W1 with the second transfer device 30B (see FIG. 8).

In this example, the first transfer device 30A and the second transfer device 30B each perform the unloading operation on two articles W that are arranged in a holding section 31. In the case where two articles W (i.e., the first article W1 and the second article W2) are held by a holding section 31 and the unloading operation is to be performed on the two articles W, the controller 2 first performs the unloading operation on the large article WL, which is the article having the larger dimension in the first direction X out of the first article W1 and the second article W2, and then performs the unloading operation on the small article WS, which is the article having the smaller dimension in the first direction X out of the first article W1 and the second article W2. In the unloading operation for the large article WL, the above-described transfer gap is set according to the dimension of the large article WL in the first direction X, and in the unloading operation for the small article WS, the above-described transfer gap is set according to the dimension of the small article WS in the first direction X.

In the case where two articles W are held by the holding section 31 and the unloading operation is to be performed on the two articles W, if the first article W1 and the second article W2 have different dimensions in the first direction X, the controller 2 first performs the unloading operation on the large article WL, and then performs the unloading operation on the small article WS. As described above, in the present embodiment, the type of an article W is determined according to which of the predetermined dimension classes the dimension of the article W in the first direction X belongs to, and if the first article W1 and the second article W2 are articles W of different types, the controller 2 determines that the first article W1 and the second article W2 have different dimensions in the first direction X.

On the other hand, in the case where two articles W are held by the holding section 31 and the unloading operation is to be performed on the two articles W, if the first article W1 and the second article W2 have equivalent dimensions in the first direction X, and furthermore the first article W1 and the second article W2 are to be stored side by side in the second direction Y in the first storage section 11A or the second storage section 11B, the controller 2 performs the unloading operation by moving both the first article W1 and the second article W2 in the second direction Y by extending and withdrawing the pair of arms 32 one time. Although FIG. 12 illustrates the case where the unloading operation can be performed on the first article W1 and the second article W2 by extending and withdrawing the pair of arms 32 one time, a configuration is possible in which the unloading operation cannot be completed by extending and withdrawing the pair of arms 32 one time, and the unloading operation is completed by repeating the extending and withdrawing of the pair of arms 32 a plurality of times. For example, a configuration is possible in which the pair of arms 32 are extended and withdrawn one time in order to move the first article W1 and the second article W2 half the required distance, and then the unloading operation is completed by extending and withdrawing the pair of arms 32 a second time. In this case, the hooks 35 that push the first article W1 and the second article W2 are different between when the pair of arms 32 extend the first time and when they extend the second time, for example.

In the present embodiment, in the case where the first article W1 and the second article W2 are articles W of the same type, the controller 2 determines that the dimensions of the first article W1 and the second article W2 in the first direction X are equivalent to each other. Note that in the case where two articles W are held by the holding section 31 and the unloading operation is to be performed on the two articles W, if the first article W1 and the second article W2 have equivalent dimensions in the first direction X, and furthermore the first article W1 and the second article W2 are not to be stored side by side in the second direction Y in the first storage section 11A or the second storage section 11B, the controller 2 first performs the unloading operation on either the first article W1 or the second article W2, and then performs the unloading operation on the other one.

In this example, the first article W1 and second article W2 held by one of the holding sections 31 are respectively a large article WL and a small article WS, and the first transfer device 30A performs the unloading operation on these two articles W. Accordingly, the controller 2 causes the first transfer device 30A to first perform the unloading operation on the first article W1 that is the large article WL (see FIG. 6), and then perform the unloading operation on the second article W2 that is the small article WS (see FIG. 8).

Also, in this example, the first article W1 and second article W2 held by the other holding section 31 are respectively a small article WS and a large article WL, and the second transfer device 30B performs the unloading operation on these two articles W. Accordingly, the controller 2 causes the second transfer device 30B to first perform the unloading operation on the second article W2 that is the large article WL (see FIGS. 4 and 5), and then (in this example, after the first transfer device 30A performs the unloading operation on the first article W1 that is a large article WL) perform the unloading operation on the first article W1 that is the small article WS (see FIG. 8). In this example, as shown in FIG. 8, the unloading operation performed on the small article WS by the second transfer device 30B and the unloading operation performed on the small article WS by the first transfer device 30A are performed in parallel.

In the case where two articles W are held by the holding section 31 and the unloading operation is to be performed on the two articles W, the controller 2 sets the transfer destination of the large article WL to, out of the first storage section 11A and the second storage section 11B, the storage section on the side of the small article WS on which the large article WL is located in the second direction Y (the second storage section 11B in FIG. 4, and the first storage section 11A in FIG. 6). On the other hand, the transfer destination of the small article WS can be set to either the first storage section 11A or the second storage section 11B. In other words, in the case where the small article WS is the first article W1, the transfer destination of the small article WS can be set to the second storage section 11B instead of the first storage section 11A, and in the case where the small article WS is the second article W2, the transfer destination of the small article WS can be set to the first storage section 11A instead of the second storage section 11B. In this example, after the first transfer device 30A performs the unloading operation on the first article W1, which is a large article WL, the conveyor 36 is caused to perform the conveying operation so as to move the second article W2, which is a small article WS, from the region of the holding section 31 on the second side Y2 in the second direction to the region on the first side Y1 in the second direction (see FIG. 7), and then the second article W2 is transferred to the first storage section 11A (see FIG. 8).

In the case where two articles W are held by the holding section 31 and the unloading operation is to be performed on the two articles W, if the unloading operation is to be first performed on the large article WL, and then the unloading operation is to be subsequently performed on the small article WS, the controller 2 first completes the unloading operation for the large article WL, then performs the narrowing operation for reducing the distance between the pair of arms 32 in the first direction X while the small article WS is arranged between the pair of arms 32 in the first direction X (see FIG. 7), and then performs the unloading operation on the small article WS (see FIG. 8). When extending the pair of arms 32 in the unloading operation for the small article WS, first the narrowing operation is completed, then the distance between the pair of arms 32 in the first direction X is set larger than a later-described target gap in the range of the above-described transfer gap, and then the pair of arms 32 are extended.

In the present embodiment, the controller 2 acquires information on the target dimension, which is the dimension in the first direction X, of the small article WS, and, in the narrowing operation, reduces the distance between the pair of arms 32 in the first direction X to a target gap that corresponds to the acquired target dimension. The target gap is set to the same value as the target dimension, or to a value obtained by adding a set value to the target dimension. As shown in FIG. 2, the controller 2 is configured to acquire dimension data 7 that includes information on dimensions of the articles W, and acquires information on the target dimensions from the dimension data 7. The dimension data 7 is, for example, data based on detection information from a detection device that detects the dimensions or identification information (a barcode or the like) of the articles W, or data included in transport instruction data transmitted from a higher-level control device to the controller 2.

In the present embodiment, the controller 2 issues an abnormality notification in the case where the distance between the pair of arms 32 in the first direction X cannot be reduced to the target gap in the narrowing operation. In this case, the controller 2 suspends the unloading operation for the small article WS and issues an abnormality notification. As shown in FIG. 2, the controller 2 is configured to control operations of the notification device 5, which is a buzzer, a rotating lamp, or the like, and, if the distance between the pair of arms 32 in the first direction X cannot be reduced to the target gap, the controller 2 operates the notification device 5 to issue an abnormality notification with use of sound, light, or the like to a worker.

In the present embodiment, the controller 2 sets the position and the width in the first direction X of the first storage section 11A in the first rack unit 10A in accordance with the dimension of an article W in the first direction X when that article W is to be stored in the first storage section 11A, and sets the position and the width in the first direction X of the second storage section 11B in the second rack unit 10B in accordance with the dimension of an article W in the first direction X when that article W is to be stored in the second storage section 11B. For example, the controller 2 can be configured to set the position and the width in the first direction X of the first storage section 11A in the first rack unit 10A and the position and the width in the first direction X of the second storage section 11B in the second rack unit 10B in accordance with the dimensions in the first direction X of the articles W to be stored in order for the gaps between pairs of articles W adjacent in the first direction X to be equivalent to each other.

Figure 10:
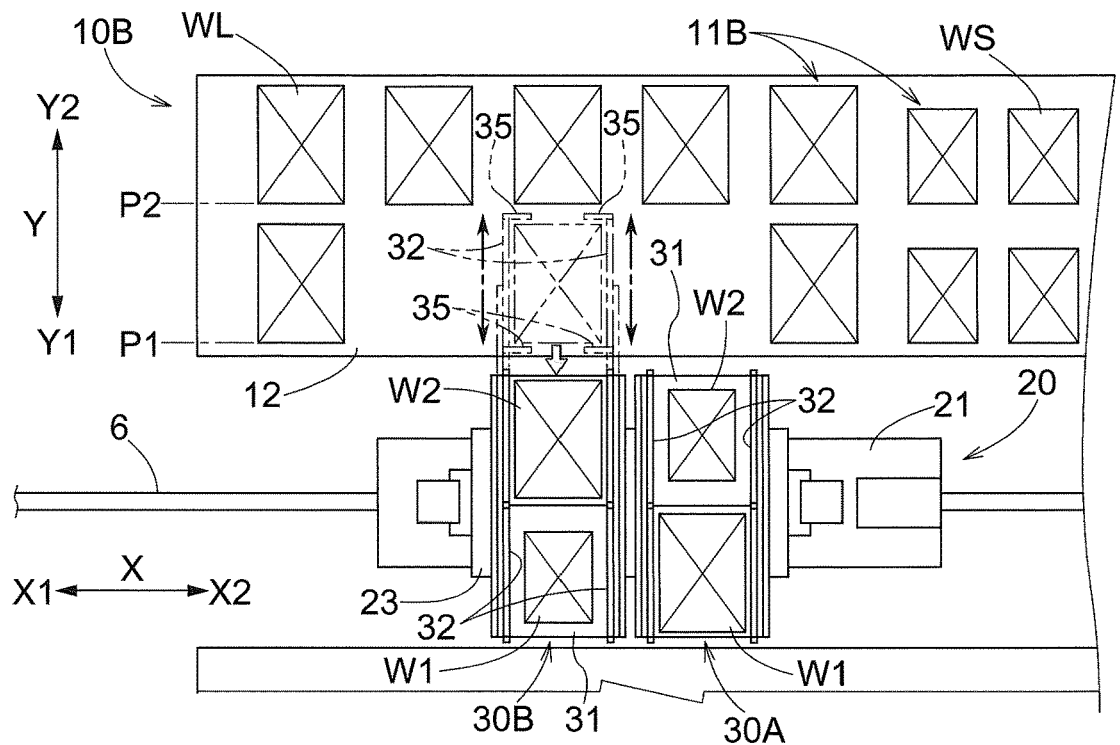
FIG. 10 is a diagram showing a situation after FIG. 9 in unloading control.

Next, an example of unloading control executed by the controller 2 will be described with reference to FIGS. 9 to 11 that show situations at various times in the unloading control in sequential order.

The controller 2 causes the transfer device 30 to perform a scooping operation while the transfer device 30 is arranged at a position corresponding to a transfer target storage section 11. In this example, the controller 2 sequentially executes a movement operation for moving the second transfer device 30B to a position corresponding to the transfer target storage section 11, a scooping operation for retrieving an article W that is to become the first article W1 with the second transfer device 30B (see FIG. 9), a movement operation for moving the second transfer device 30B to a position corresponding to the transfer target storage section 11, and a scooping operation for retrieving an article W that is to become the second article W2 with the second transfer device 30B (see FIG. 10). Although this will not be described in detail, in this example, the scooping operation for retrieving two articles W that are to become the first article W1 and the second article W2 is performed by the first transfer device 30A between the scooping operation for retrieving the article W that is to become the first article W1 with the second transfer device 30B (see FIG. 9) and the scooping operation for retrieving the article W that is to become the second article W2 with the second transfer device 30B (see FIG. 10).

In this example, the first transfer device 30A and the second transfer device 30B each perform the scooping operation for retrieving two articles W that are to become the first article W1 and the second article W2 while no article W is held by the holding section 31. In this way, in the case of performing the scooping operation for retrieving two articles W that are to become the first article W1 and the second article W2 while no article W is held by the holding section 31, the controller 2 first performs the scooping operation for retrieving the small article WS, which is the one of the two articles W that has the smaller dimension in the first direction X, and then performs the scooping operation for retrieving the large article WL, which is the one of the two articles W that has the larger dimension in the first direction X. In the scooping operation for retrieving the large article WL, the above-described transfer gap is set to a distance corresponding to the dimension of the large article WL in the first direction X, and in the scooping operation for retrieving the small article WS, the above-described transfer gap is set to a distance corresponding to the dimension of the small article WS in the first direction X.

In the case of performing the scooping operation for retrieving two articles W that are to become the first article W1 and the second article W2 while no article W is held by the holding section 31, if the first article W1 and the second article W2 have different dimensions in the first direction X, the controller 2 first performs the scooping operation for retrieving the small article WS, and then performs the scooping operation for retrieving the large article WL. On the other hand, in the case of performing the scooping operation for retrieving two articles W that are to become the first article W1 and the second article W2 while no article W is held by the holding section 31, if the two articles W have equivalent dimensions in the first direction X, and furthermore the two articles W are being stored side by side in the second direction Y in the first storage section 11A or the second storage section 11B, the controller 2 performs the scooping operation by moving both of the two articles W in the second direction Y by extending and withdrawing the pair of arms 32 one time. FIG. 13 illustrates a case where the scooping operation for retrieving two articles W that are to become the first article W1 and the second article W2 is completed by extending and withdrawing the pair of arms 32 one time.

Note that in the case of performing the scooping operation for retrieving two articles W that are to become the first article W1 and the second article W2 while no article W is held by the holding section 31, if the two articles W have equivalent dimensions in the first direction X, and furthermore the two articles W are not being stored side by side in the second direction Y in the first storage section 11A or the second storage section 11B, the controller 2 first performs the scooping operation for retrieving one of the two articles W, and then performs the scooping operation for retrieving the other one of the two articles W.

In this example, the first transfer device 30A performs the scooping operation for retrieving two articles W, namely a large article WL that is to become the first article W1 and a small article WS that is to become the second article W2, while no article W is held by the holding section 31. For this reason, the controller 2 causes the first transfer device 30A to first perform the scooping operation for retrieving the small article WS that is to become the second article W2, and then perform the scooping operation for retrieving the large article WL that is to become the first article W1.

Also, in this example, the second transfer device 30B performs the scooping operation for retrieving two articles W, namely a large article WL that is to become the first article W1 and a small article WS that is to become the second article W2, while no article W is held by the holding section 31. For this reason, the controller 2 causes the second transfer device 30B to first perform the scooping operation for retrieving the small article WS that is to become the first article W1 (see FIG. 9), and then perform the scooping operation for retrieving the large article WL that is to become the second article W2 (see FIG. 10).

When all of the scooping operations (in this example, the scooping operation for retrieving the first article W1 and the second article W2 with the first transfer device 30A and the scooping operation for retrieving the first article W1 and the second article W2 with the second transfer device 30B) are complete, the controller 2 causes the mobile body 20 to perform movement operations such that the transfer device 30 (in the present embodiment, both the first transfer device 30A and the second transfer device 30B) is located at a position corresponding to the loading and unloading section 3, as shown in FIG. 11. The transfer operation for transferring the articles W from the holding section 31 to the loading and unloading section 3 is performed while the transfer device 30 is located at the position corresponding to the loading and unloading section 3. In the present embodiment, through conveying performed by the second conveyor 4B provided in the loading and unloading section 3 and conveying performed by the conveyor 36 provided in the transfer device 30, the articles W are moved from the holding section 31 to the loading and unloading section 3, and thus the articles W are transferred from the holding section 31 to the loading and unloading section 3.

Other Embodiments

Next, other embodiments of the article storage facility will be described.

(1) In the above embodiment, an example is described in which the hooks 35 are provided on each of the two arms 32, and an article W arranged between the pair of arms 32 is moved in the second direction Y by the transfer device 30 by extending or withdrawing the pair of arms 32 so as to push or pull the article W with the hooks 35. However, the present disclosure is not limited to such a configuration, and a configuration is also possible in which hooks 35 are not provided on each of the two arms 32. For example, a configuration is possible in which an article W arranged between the pair of arms 32 is moved in the second direction Y by the transfer device 30 by extending or withdrawing the pair of arms 32 while the article W is sandwiched from two sides in the first direction X. In such a configuration, each of the two arms 32 may be provided with a conveyor (e.g., a belt conveyor) that comes into contact with a side surface of the article W and conveys the article W in the second direction Y, and the article W arranged between the pair of arms 32 may be moved in the second direction Y by operation of the conveyor in addition to the extending or withdrawing of the pair of arms 32.

(2) In the above embodiment, an example is described in which the controller 2 issues an abnormality notification in the case where the distance between the pair of arms 32 in the first direction X cannot be reduced to the target gap in the narrowing operation. However, the present disclosure is not limited to such a configuration, and in the case where the distance between the pair of arms 32 in the first direction X cannot be reduced to the target gap in the narrowing operation, the controller 2 can also cause the transfer device 30 to perform an operation for correcting the orientation of the small article WS to an appropriate orientation, separately from the narrowing operation.

(3) In the above embodiment, an example is described in which the controller 2 sets the position and the width in the first direction X of the storage section 11 in the rack unit 10 in accordance with the dimension in the first direction X of the article W that is to be stored in the storage section 11. However, the present disclosure is not limited to such a configuration, and a configuration is also possible in which the position and the width of the storage section 11 in the rack unit 10 are fixed.

(4) In the above embodiment, an example is described in which the holding section 31 includes the conveyor 36 for conveying an article W in the second direction Y (in the example described in the above embodiment, two conveyors 36 side by side in the second direction Y), and in the transfer operation, the transfer device 30 causes the conveyor 36 to operate in synchronization with the movement direction and the movement speed of the article W being moved by the extending or withdrawing of the pair of arms 32. However, the present disclosure is not limited to such a configuration, and a configuration is also possible in which the holding section 31 does not include the conveyor 36, and the article W slides on the holding section 31 (specifically, on the support surface of the holding section 31 that faces an upward side Z1) as the transfer operation is performed.

(5) In the above-described embodiment, an example is described in which the first transfer device 30A and the second transfer device 30B are supported side by side in the first direction X by the same lifting and lowering section 23 so as to integrally ascend and descend along with the ascending and descending of the lifting and lowering section 23. However, the present disclosure is not limited to such a configuration, and a configuration is also possible in which the first transfer device 30A and the second transfer device 30B are supported by two lifting and lowering sections that can ascend and descend independently of each other, such that the two transfer devices can ascend and descend independently of each other.

(6) In the above embodiment, an example is described in which the article storage facility 1 (specifically, the mobile body 20) includes the first transfer device 30A and the second transfer device 30B, which are two transfer devices 30 that can perform transfer operations independently of each other. However, the present disclosure is not limited to such a configuration, and the article storage facility 1 may include only one transfer device 30, or the article storage facility 1 may include three or more transfer devices 30 that can perform transfer operations independently of each other.

(7) In the above embodiment, an example is described in which the mobile body 20 is a stacker crane. However, the present disclosure is not limited to such a configuration, and the mobile body 20 can also be a transport device other than a stacker crane, such as a transport device that travels along travel routes provided in correspondence with the levels of the rack unit 10.

(8) In the above embodiment, an example is described in which the rack unit 10 includes a plurality of storage sections 11 aligned in the up-down direction Z. However, the present disclosure is not limited to such a configuration, and a configuration is also possible in which the rack unit 10 includes storage sections 11 at only one height.

(9) It should be noted that the configurations disclosed in each of the above-described embodiments can also be applied in combination with configurations disclosed in other embodiments (including combinations between embodiments described as other embodiments) as long as no contradiction arises. Regarding such other configurations as well, the embodiments disclosed in this specification are merely examples in all respects. Therefore, various modifications can be made as appropriate without departing from the scope of the present disclosure.

Overview of Embodiments

The following describes an overview of the article storage facility described above.

An article storage facility according to an aspect of the present disclosure includes: a first rack unit including a plurality of first storage sections aligned in a first direction along a horizontal plane; a second rack unit including a plurality of second storage sections aligned in the first direction, the second rack unit facing the first rack unit in a second direction orthogonal to the first direction in a vertical view along an up-down direction; a mobile body configured to move in the first direction at a position between the first rack unit and the second rack unit in the second direction; at least one transfer device mounted to the mobile body and including a holding section configured to hold a transfer target article, the at least one transfer device being configured to transfer the transfer target article between the holding section and the first storage sections and between the holding section and the second storage sections; and a controller configured to control operations of the mobile body and the at least one transfer device, wherein each of the first storage sections and each of the second storage sections is configured to store two articles side by side in the second direction, the holding section is configured to hold two articles side by side in the second direction, the at least one transfer device includes a pair of arms configured to extend and withdraw in the second direction, the at least one transfer device being further configured to change a distance between the pair of arms in the first direction, the at least one transfer device performs a transfer operation of transferring the transfer target article between the holding section and one of the first storage sections or one of the second storage sections by extending and withdrawing the pair of arms in the second direction while the transfer target article is located between the pair of arms in the first direction, the transfer operation includes (i) an unloading operation, in which the at least one transfer device delivers the transfer target article from the holding section to one of the first storage sections or one of the second storage sections, and (ii) a scooping operation, in which the transfer device transfers the transfer target article from one of the first storage sections or one of the second storage sections to the holding section, with a first article being an article on one side in the second direction and a second article being an article on another side in the second direction while the first article and the second article are held side by side in the second direction by the holding section, in the unloading operation performed on two articles while the two articles are held by the holding section, the controller first performs the unloading operation on a large article, which is an article having a larger dimension in the first direction out of the first article and the second article, and then performs the unloading operation on a small article, which is an article having a smaller dimension in the first direction out of the first article and the second article, and in the scooping operation performed on two articles that are to become the first article and the second article while no article is held by the holding section, the controller first performs the scooping operation on a small article, which is an article having a smaller dimension in the first direction out of the two articles, and then performs the scooping operation on a large article, which is an article having a larger dimension in the first direction out of the two articles.

According to this configuration, in the case where two articles are arranged in the holding section and the unloading operation is to be performed on the two articles, even if the dimensions of the two articles in the first direction are different from each other, by performing the unloading operation first on the large article and then on small article, the unloading operation can be performed on the small article while a large article is not present in the holding section. Accordingly, when performing the unloading operation on the small article, it is possible to avoid a situation in which the presence of a large article prevents the distance between the pair of arms in the first direction from being reduced to a distance suitable for the small article unloading operation, and both the large article and the small article can be appropriately delivered to the storage section (first storage section or second storage section, which similarly applies hereinafter) with the pair of arms.

Also, according to this configuration, in the case of performing the scooping operation on two articles that are to become the first article and the second article while no article is held by the holding section, even if the dimensions of the two items in the first direction are different from each other, by performing the scooping operation first on the small article and then on the large article, the scooping operation can be performed on the small article while a large article is not present in the holding section. Accordingly, when performing the scooping operation on the small article, it is possible to avoid a situation in which the presence of a large article prevents the distance between the pair of arms in the first direction from being reduced to a distance suitable for the small article scooping operation, and both the large article and the small article can be appropriately received from the storage section with the pair of arms.

As described above, according to this configuration, even if two articles having equivalent dimensions in the first direction are not arranged side by side in the second direction on a transfer device, article transfer can be appropriately performed between a transfer device that can hold two articles side by side in the second direction and a storage section that can store two articles side by side in the second direction.

Here, it is preferable that in the unloading operation performed on two articles while the two articles are held by the holding section, the controller sets a transfer destination of the large article to, among the first storage sections and the second storage sections, a storage section on a side of the small article on which the large article is located in the second direction.

According to this configuration, in the case where a large article and a small article are held by the holding section and the unloading operation is to be formed on the large article first, it is possible to appropriately deliver the large article to the transfer destination storage section while avoiding interference with the small article located in the holding section.

Also, it is preferable that in the unloading operation performed on two articles while the two articles are held by the holding section, in a case where the first article and the second article have equivalent dimensions in the first direction and are to be stored side by side in the second direction in one of the first storage sections or one of the second storage sections, the controller performs the unloading operation by moving both the first article and the second article in the second direction by extending and withdrawing the pair of arms one time.

According to this configuration, in the case where two articles are held by the holding section, furthermore the unloading operation is to be performed on the two articles, and furthermore the two articles are to be stored side by side in the second direction in the storage section, if the two articles have equivalent dimensions in the first direction, the unloading operation is performed such that both of the two articles are moved in the second direction by extending and withdrawing the pair of arms one time, thus making it possible to improve the efficiency of the unloading operation.

Also, it is preferable that in the scooping operation performed on two articles that are to become the first article and the second article while no article is held by the holding section, in a case where the two articles have equivalent dimensions in the first direction and are stored side by side in the second direction in one of the first storage sections or one of the second storage sections, the controller performs the scooping operation by moving both of the two articles in the second direction by extending and withdrawing the pair of arms one time.

According to this configuration, in the case where no articles are held by the holding section, furthermore the scooping operation is to be performed on two articles stored side by side in the second direction in a storage section, and furthermore the two articles are to be arranged side by side in the second direction in the holding section, if the two articles have equivalent dimensions in the first direction, the scooping operation is performed such that both of the two articles are moved in the second direction by extending and withdrawing the pair of arms one time, thus making it possible to improve the efficiency of the scooping operation.

Also, it is preferable that in the unloading operation performed on two articles while the two articles are held by the holding section, in a case of first performing the unloading operation on the large article and then performing the unloading operation on the small article, the controller completes the unloading operation performed on the large article, then performs a narrowing operation to reduce a distance between the pair of arms in the first direction while the small article is located between the pair of arms in the first direction, and then performs the unloading operation on the small article.

In the case where a large article and a small article are arranged in the holding section, and the unloading operation is to be performed first on the large article and then on the small article, the distance between the pair of arms in the first direction is set greater than or equal to a distance corresponding to the width of the large article in the first direction until the large article unloading operation is complete. For this reason, there is a possibility that the orientation (the position and/or directionality) of the small article will change from the appropriate orientation before the large article unloading operation is complete. According to the above configuration, the narrowing operation is performed after completion of the large article unloading operation, and therefore even if the orientation of the small article changes from the appropriate orientation, the orientation of the small article can be corrected to the appropriate orientation before performing the unloading operation on the small article. Accordingly, the unloading operation can be appropriately performed on the small article.

In the configuration in which the controller performs the narrowing operation as described above, it is preferable that the controller acquires information on a target dimension of the small article, the target dimension being a dimension of the small article in the first direction, in the narrowing operation, the controller reduces the distance between the pair of arms in the first direction to a target gap corresponding to the acquired target dimension, and the controller issues an abnormality notification in response to an inability to reduce the distance between the pair of arms in the first direction to the target gap.

According to this configuration, an abnormality notification can be issued in a case where the orientation of the small article cannot be corrected to the appropriate orientation by the narrowing operation, such as the case where the orientation of the small article has greatly changed from the appropriate orientation. Accordingly, it is possible to avoid performing the unloading operation on the small article in a situation where it is difficult to appropriately perform the unloading operation on the small article.

In the article storage facility having any of the above configurations, it is preferable that in a case of storing the transfer target article in one of the first storage sections of the first rack unit, the controller sets a position and a width in the first direction of the one first storage section in accordance with a dimension of the transfer target article in the first direction, and in a case of storing the transfer target article in one of the second storage sections of the second rack unit, the controller sets a position and a width in the first direction of the one second storage section in accordance with the dimension of the transfer target article in the first direction.

According to this configuration, compared to the case where the positions and widths in the first direction of the storage sections in the first rack unit and the second rack unit are fixed, articles having different dimensions in the first direction can be more efficiently stored side by side in the first direction in the first rack unit and the second rack unit.

Also, it is preferable that the at least one transfer device includes a first transfer device and a second transfer device that are configured to perform the transfer operation independently of each other.

According to this configuration, a total of four articles held by the first transfer device and the second transfer device can be collectively moved by the mobile body, thus making it possible to improve the article processing efficiency in the article storage facility compared to the case where only one transfer device is provided.

The article storage facility according to the present disclosure need only achieve at least one of the effects described above.

DESCRIPTION OF REFERENCE SIGNS

1 Article storage facility
2 Controller
10A First rack unit
10B Second rack unit
11A First storage section
11B Second storage section
20 Mobile body
30 Transfer device
30A First transfer device
30B Second transfer device
31 Holding section
32 Arm
W Article
W1 First article
W2 Second article
WL Large article
WS Small article
X First direction
Y Second direction
Z Up-down direction

The invention claimed is:
1. An article storage facility comprising:
a first rack unit comprising a plurality of first storage sections aligned in a first direction along a horizontal plane;
a second rack unit compromising a plurality of second storage sections aligned in the first direction, the second rack unit facing the first rack unit in a second direction orthogonal to the first direction in a vertical view along an up-down direction;
a mobile body configured to move in the first direction at a position between the first rack unit and the second rack unit in the second direction;
at least one transfer device mounted to the mobile body and comprising a holding section configured to hold a transfer target article, the at least one transfer device configured to transfer the transfer target article between the holding section and the first storage sections and between the holding section and the second storage sections; and
a controller configured to control operations of the mobile body and the at least one transfer device,
wherein:

each of the first storage sections and each of the second storage sections is configured to store two articles side by side in the second direction,
the holding section is configured to hold two articles side by side in the second direction,
the at least one transfer device comprises a pair of arms configured to extend and withdraw in the second direction, the at least one transfer device further configured to change a distance between the pair of arms in the first direction,
the at least one transfer device performs a transfer operation of transferring the transfer target article between the holding section and one of the first storage sections or one of the second storage sections by extending and withdrawing the pair of arms in the second direction while the transfer target article is located between the pair of arms in the first direction,
the transfer operation includes: (i) an unloading operation, in which the at least one transfer device delivers the transfer target article from the holding section to one of the first storage sections or one of the second storage sections, and (ii) a scooping operation, in which the transfer device transfers the transfer target article from one of the first storage sections or one of the second storage sections to the holding section,
a first article is an article on one side in the second direction and a second article is an article on another side in the second direction while the first article and the second article are held side by side in the second direction by the holding section,
in the unloading operation performed on two articles while the two articles are held by the holding section, the controller first performs the unloading operation on a large article, which is an article having a larger dimension in the first direction out of the first article and the second article, and then performs the unloading operation on a small article, which is an article having a smaller dimension in the first direction out of the first article and the second article, and
in the scooping operation performed on two articles that become the first article and the second article while no article is held by the holding section, the controller first performs the scooping operation on a small article, which is an article having a smaller dimension in the first direction out of the two articles, and then performs the scooping operation on a large article, which is an article having a larger dimension in the first direction out of the two articles.
2. The article storage facility according to claim 1, wherein in the unloading operation performed on two articles while the two articles are held by the holding section, the controller sets a transfer destination of the large article to, among the first storage sections and the second storage sections, a storage section on a side of the small article on which the large article is located in the second direction.
3. The article storage facility according to claim 1, wherein in the unloading operation performed on two articles while the two articles are held by the holding section, in a case where the first article and the second article have equivalent dimensions in the first direction and are to be stored side by side in the second direction in one of the first storage sections or one of the second storage sections, the controller performs the unloading operation by moving both the first article and the second article in the second direction by extending and withdrawing the pair of arms one time.

4. The article storage facility according to claim 1,
wherein in the scooping operation performed on two articles that become the first article and the second article while no article is held by the holding section, in a case where the two articles have equivalent dimensions in the first direction and are stored side by side in the second direction in one of the first storage sections or one of the second storage sections, the controller performs the scooping operation by moving both of the two articles in the second direction by extending and withdrawing the pair of arms one time.

5. The article storage facility according to claim 1,
wherein in the unloading operation performed on two articles while the two articles are held by the holding section, in a case of first performing the unloading operation on the large article and then performing the unloading operation on the small article, the controller completes the unloading operation performed on the large article, then performs a narrowing operation to reduce a distance between the pair of arms in the first direction while the small article is located between the pair of arms in the first direction, and then performs the unloading operation on the small article.

6. The article storage facility according to claim 5, wherein:
the controller acquires information on a target dimension of the small article, the target dimension is a dimension of the small article in the first direction,
in the narrowing operation, the controller reduces the distance between the pair of arms in the first direction to a target gap corresponding to the acquired target dimension, and
the controller issues an abnormality notification in response to an inability to reduce the distance between the pair of arms in the first direction to the target gap.

7. The article storage facility according to claim 1,
wherein in a case of storing the transfer target article in one of the first storage sections of the first rack unit, the controller sets a position and a width in the first direction of the one first storage section in accordance with a dimension of the transfer target article in the first direction, and in a case of storing the transfer target article in one of the second storage sections of the second rack unit, the controller sets a position and a width in the first direction of the one second storage section in accordance with the dimension of the transfer target article in the first direction.

8. The article storage facility according to claim 1,
wherein the at least one transfer device comprises a first transfer device and a second transfer device that are configured to perform the transfer operation independently of each other.

* * * * *

UNITED STATES PATENT AND TRADEMARK OFFICE
CERTIFICATE OF CORRECTION

PATENT NO. : 12,269,678 B2  
APPLICATION NO. : 18/266920  
DATED : April 8, 2025  
INVENTOR(S) : Fumiaki Tatemi Page 1 of 1

It is certified that error appears in the above-identified patent and that said Letters Patent is hereby corrected as shown below:

In the Claims

Column 25, Line 50, Claim 1, delete "compromising" and insert -- comprising --

Signed and Sealed this  
Fifteenth Day of July, 2025

Coke Morgan Stewart  
*Acting Director of the United States Patent and Trademark Office*